(12) United States Patent
Schmidt et al.

(10) Patent No.: US 10,539,704 B2
(45) Date of Patent: *Jan. 21, 2020

(54) SYSTEMS AND METHODS FOR MAPPING HYDROCARBON RESERVOIRS USING ELECTROMAGNETIC TRANSMISSIONS

(71) Applicant: Saudi Arabian Oil Company, Dhahran (SA)

(72) Inventors: Howard Khan Schmidt, Dhahran (SA); Jesus Manuel Felix Servin, Dhahran (SA); Erika Shoemaker Ellis, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 158 days.

This patent is subject to a terminal disclaimer.

(21) Appl. No.: 15/630,129

(22) Filed: Jun. 22, 2017

(65) Prior Publication Data
US 2017/0371062 A1    Dec. 28, 2017

Related U.S. Application Data

(60) Provisional application No. 62/353,285, filed on Jun. 22, 2016.

(51) Int. Cl.
*G01V 3/00* (2006.01)
*G01V 3/28* (2006.01)
(Continued)

(52) U.S. Cl.
CPC ............... *G01V 3/28* (2013.01); *E21B 43/16* (2013.01); *E21B 43/20* (2013.01);
(Continued)

(58) Field of Classification Search
CPC . G01V 3/12; G01V 3/083; G01V 3/28; G01V 3/30; G01S 13/885; G01S 13/88
(Continued)

(56) References Cited

U.S. PATENT DOCUMENTS

| 6,108,606 A | 8/2000 | Korneev et al. |
| 2006/0038571 A1* | 2/2006 | Ostermeier ............ G01V 3/28 |
| | | 324/338 |

(Continued)

FOREIGN PATENT DOCUMENTS

| CA | 2883944 A1 | 3/2014 |
| CA | 2921822 A1 | 3/2015 |

(Continued)

OTHER PUBLICATIONS

Al-Ali et al., "Looking Deep into the Reservoir", Oilfield Review, 2009, pp. 38-47, vol. 21, No. 21, Schlumberger.
(Continued)

*Primary Examiner* — Raul J Rios Russo
(74) *Attorney, Agent, or Firm* — Bracewell LLP; Constance G. Rhebergen; Christopher L. Drymalla

(57) ABSTRACT

Provided are systems and methods for mapping hydrocarbon reservoirs. Operations include disposing an electromagnetic (EM) transmitter and an EM receiver into first and second wellbores of first and second wells, respectively, penetrating a resistive layer of a subsurface formation bounded by first and second conductive layers. The EM transmitter and receiver each being disposed at depths proximate to intersections of the first and second wellbores and the resistive layer, respectively. The operations further including transmitting an EM signal between the EM transmitter and receiver via the resistive layer, determining transport properties associated with propagation of the EM signal from the EM transmitter to the EM receiver via the resistive layer, and determining the presence of an anomaly in at least one of the conductive layers based on the travel time.

48 Claims, 9 Drawing Sheets

(51) Int. Cl.
| | |
|---|---|
| *G01V 3/08* | (2006.01) |
| *E21B 47/022* | (2012.01) |
| *E21B 43/16* | (2006.01) |
| *E21B 43/20* | (2006.01) |
| *G01V 3/12* | (2006.01) |
| *G01V 3/30* | (2006.01) |
| *G01S 13/88* | (2006.01) |

(52) U.S. Cl.
CPC ........ *E21B 47/02216* (2013.01); *G01V 3/083* (2013.01); *G01V 3/12* (2013.01); *G01V 3/30* (2013.01); *G01S 13/88* (2013.01); *G01S 13/885* (2013.01)

(58) Field of Classification Search
USPC .................................. 324/323, 327, 332, 376
See application file for complete search history.

(56) References Cited

U.S. PATENT DOCUMENTS

| | | | | |
|---|---|---|---|---|
| 2007/0256832 | A1* | 11/2007 | Hagiwara | G01V 3/28 166/250.16 |
| 2009/0015261 | A1* | 1/2009 | Yang | G01V 3/28 324/343 |
| 2009/0237083 | A1* | 9/2009 | Ostermeier | G01V 3/28 324/338 |
| 2010/0097065 | A1* | 4/2010 | Itskovich | G01V 3/28 324/336 |
| 2011/0063949 | A1* | 3/2011 | Itskovich | G01V 1/42 367/81 |
| 2011/0133740 | A1* | 6/2011 | Seydoux | G01V 3/28 324/338 |
| 2012/0268135 | A1* | 10/2012 | Marsala | G01V 3/30 324/338 |
| 2014/0239957 | A1 | 8/2014 | Zhang et al. | |
| 2014/0347055 | A1 | 11/2014 | Schmidt | |
| 2019/0128116 | A1* | 5/2019 | Thiel | E21B 47/121 |

FOREIGN PATENT DOCUMENTS

| | | |
|---|---|---|
| WO | 2010091146 A2 | 8/2010 |
| WO | 2013181527 A1 | 12/2013 |

OTHER PUBLICATIONS

Marsala et al., "3D inversion of borehole to surface electromagnetic data in a multiple reservoirs survey", SEG Denver Annual Meeting, 2014, pp. 2600-2604, SEG.

Marsala et al., "Crosswell electromagnetic induction between two widely spaced horizontal wells: Coiled-tubing conveyed data collection and 3D inversion from a carbonate reservoir in Saudi Arabia", SEG New Orleans Annual Meeting, 2015, pp. 2848-2852.

Marsala et al., "Crosswell Electromagnetic Tomography: from Resistivity Mapping to Interwell Fluid Distribution", IPTC Conference, 2008, pp. 1-6, International Petroleum Technology Conference.

Stolarczyk et al., "Advanced Electromagnetic Wave Technologies for the Detection of Abandoned Mine Entries and Delineation of Barrier Pillars", Interactive Forum on Geophysical Technologies for Detecting Underground Coal Mine Voids, 2003, pp. 1-65.

Hato T. et al.: "Development of HTS-SQUID System for a Monitoring System of CO2 Enhanced Oil Recovery", IEEE Transactions on Applied Superconductivity. IEEE Service Center, Los Alamitos, CA, US, vol. 27, No. 4, Jun. 1, 2017 (pp. 1-5).

International Search Report and Written Opinion for International Application No. PCT/US2017/051458; Application Filing Date Sep. 14, 2017; Report dated Mar. 14, 2018 (pp. 1-13).

Labrecque D J: "Cross-Borehole TEM for Enhanced Oil Recovery: A Model Study", Geoexploration, 28 (1991) Elsevier, Amsterdam, NL, pp. 329-348.

Narayan S. et al.: "Sensitivity Studies of Resistivity Monitoring for Shallow Enhanced Recovery Processes—A Numerical Case History", Journal of Canadian Petroleum Technology, Canadian Institute of Mining, Metallurgy and Petroleum, CA, vol. 39, No. 2, 1 F.

Co-Pending U.S. Appl. No. 15/704,161, filed Sep. 14, 2017.

International Search Report and Written Opinion for related PCT Application No. PCT/US2017/038691 dated Aug. 29, 2017; 13 pages.

* cited by examiner

SYSTEMS AND METHODS FOR MAPPING HYDROCARBON RESERVOIRS USING ELECTROMAGNETIC TRANSMISSIONS

RELATED APPLICATIONS

This application claims the benefit of U.S. Provisional Patent Application No. 62/353,285 filed on Jun. 22, 2016 and titled "Improved Saturation Mapping Using Magnetic Agents", which is hereby incorporated by reference in its entirety.

FIELD OF INVENTION

The present invention relates generally to assessment of reservoirs and more particularly to systems and methods for mapping reservoirs using electromagnetic (EM) transmissions.

BACKGROUND OF THE INVENTION

Petroleum exploration and production emphasizes optimizing production of hydrocarbons from subsurface hydrocarbon reservoirs. This can include drilling multiple wells (e.g., a field of wells) into a reservoir to extract hydrocarbons (e.g., oil) trapped in the reservoir. In some instances, enhanced oil recovery (EOR) techniques are employed to assist in extracting hydrocarbons from oil and gas reservoirs. Common EOR techniques include water injection (also referred to as "water-flooding"), thermal injection, gas injection, chemical injection and the like. In the case of water injection, water is typically injected into a reservoir via one or more injection wells, to promote the flow of the hydrocarbons in the reservoir to one or more productions wells in the field.

The techniques for optimizing reservoir production often rely on accurate assessments of the reservoir, including monitoring the locations of hydrocarbons and injected fluids as they move through the reservoir. For example, it is desirable to track the progression of a slug of injected water as it moves through a reservoir to determine if and when the slug will reach a production well, and to track the location of bypassed pockets of oil still trapped in the reservoir to identify locations for additional production to extract the bypassed oil. In some instances, tracking and estimation of a waterfront (a leading edge of a pocket of injected water, also referred to as a flood-front) in a reservoir is accomplished via monitoring initial water production at production wells (referred to as "water break-through") and a ratio of water produced versus the volume of total liquids produced at production wells (referred to as "water cut"). Unfortunately, these techniques can be complicated by the irregular structures of reservoirs. For example, in the case of tracking injected water, vertical and horizontal variations in permeability, as well as fracture corridors scattered irregularly along the length of a reservoir, can make it difficult to accurately determine where the injected water is located in the reservoir and to predict how it will move through the reservoir. This can be further exacerbated by water injections at different wellsites over extended periods of time that make it difficult to track the origin and movement of the water. For example, the Ghawar field, a super-giant conventional oil field in Saudi Arabia that is in secondary recovery using peripheral seawater injection, has a primary reservoir which includes a thick layer of carbonate sealed by anhydrite that is overlain by a second formation, which also includes a thick layer of carbonate sealed by anhydrite. Production and reservoir management for the Ghawar field is complicated by vertical (stratification) and horizontal (super-k areas) variations in permeability as well as fracture corridors scattered irregularly along the length of the field. As a result, it can be difficult to determine where injected water is located in the Ghawar field and to predict how it will move through the reservoir.

SUMMARY OF THE INVENTION

Applicants have recognized that improved techniques for monitoring reservoirs, such as reservoirs of the Ghawar field, are desired to predict and prevent early water breakthrough and to locate major regions of bypassed oil for subsequent extraction. Several techniques have been employed to monitor reservoirs, such as passive seismic monitoring and 4D microgravity measurements, cross-well electromagnetic imaging (CWEM), and borehole to surface electromagnetic imaging. Unfortunately each of these techniques have their own sets of drawbacks. For example, in the North Sea and in the Arabian Gulf, water-flood monitoring has been accomplished using four-dimension (4D) seismic. Applicants have recognized, however, that 4D seismic is of limited use in certain circumstances, such as land-based carbonate reservoirs, due at least to a limited acoustic impedance contrast between oil and water-filled pore space, making it difficult to delineate the two. CWEM technology generally uses phase shifts of low frequency continuous wave (CW) signals (e.g., having a frequency in the range of about 100 hertz (Hz), corresponding to a free-space wavelength of about 3,000,000 meters (m)) to map variations in conductivity. Applicants have recognized, however, that such CWEM techniques have limited intrinsic imaging resolution and cannot distinguish the source of a given slug of water in a reservoir. In view of these and other shortcomings, Applicants have developed EM detection techniques that employ naturally occurring planar transmission lines of reservoirs for transmission of EM signals there through for use in determining locations of substances (e.g., hydrocarbons and fluids) in the reservoirs.

Applicants have recognized that the velocity of an EM signal can be influenced by the properties of the medium that it propagates through, and that the velocity of an EM signal propagating through a medium bounded by other mediums can be influenced by the properties of the adjacent (or "bounding") mediums. For example, in the case of a relatively resistive layer (or "resistive layer") of a reservoir that is sandwiched between two relatively conductive layers (or "conductive layers") (e.g., an anhydrite layer that is sandwiched between two carbonate layers of the reservoir), the velocity of an EM signal propagating through the resistive layer can be influenced by the properties of the two conductive layers. Consistent with the premise that increasing relative electric permittivity ($\epsilon_r$) decreases EM signal velocity, Applicants have recognized that an EM signal that propagates through the resistive layer with a relatively high velocity may indicate the presence of a substance having a relatively low permittivity, such as oil, in the conductive layers; and, in contrast, an EM signal that propagates through the resistive layer with a relatively low velocity may indicate the presence of a substance having a relatively high permittivity, such as water, in the conductive layers. The concept works similarly with changes in magnetic permeability ($\mu$). Consistent with this, Applicants have also recognized that the location and types of substances present in the portions of the conductive layers located adjacent (e.g., immediately above and/or below or proximally above and/or below) a path through a resistive layer can be determined based on, for example, a total travel time required for an EM signal to propagate across the path. For example, where a travel time for an EM signal is relatively short, it can be determined that an oil pocket is present in the portions of the conductive layers located adjacent a path through the resistive layer that extends between an EM transmitter and an EM receiver used to generate and receive the EM signal; and, in contrast, where the travel time for an EM signal is relatively long, it can be determined that a water pocket is present in the portions of the conductive layers located adjacent a path through the resistive layer that extends between an EM transmitter and an EM receiver used to generate and receive the EM signal.

In some embodiments, a first EM sensor (e.g., an EM transmitter) is disposed in a first wellbore of a first well (proximate an intersection of the first wellbore with the resistive layer) and/or a second EM sensor (e.g., a EM receiver) is disposed in a second wellbore of a second well (proximate an intersection of the second borehole with the resistive layer). In some embodiments, the EM sensors are disposed in an uncased, open-hole portion of the wellbore.

In some embodiments, a casing string of a well is employed as a sensor (e.g., an EM transmitter and/or an EM receiver). For example, a well may include a magnetic conductive casing string (e.g., a steel casing string) that terminates at or near the resistive layer. In the case of the casing string being employed as an EM transmitter, an EM solenoid can be coupled to the casing string at or near the surface (e.g., at a wellhead coupled to the casing string at the surface), and the EM solenoid may be activated (e.g., driven with a current) to generate an EM signal that travels down the casing string and is radiated into the resistive layer at or near the termination of the casing string. Thus, the casing string may act as an antenna for transmitting the EM signal into the resistive layer. In the case of the casing string being employed as an EM receiver, an EM solenoid may be coupled to the casing string at or near the surface (e.g., at a wellhead coupled to the casing at the surface), and the EM solenoid may be activated (e.g., to sense a current through the EM solenoid) to receive the EM signal that is radiates into the casing string from the resistive layer at or near the termination of the casing string, and travels up the casing string to the EM solenoid. Thus, the casing string may act as an antenna for receiving the EM signal. Accordingly, in some instances, existing wells and conductive casing strings in a reservoir can be employed to transmit and receive EM signal via a resistive layer of the reservoir. Such embodiments may be advantageous as the EM detection techniques can be employed without having to run a tool (e.g., an EM sensor) into the wellbore. Thus, production may continue uninterrupted while the EM detection operations are conducted.

In some embodiments, an EM signal may have a frequency that is low enough to provide an extended range of detection, while being high enough to provide sufficient image resolution. For example, an EM signal may be generated with frequency of about 1 MHz which can provide for effective transmissions of more than 1000 m across a resistive layer, while providing image resolution in the order of 30-50 m. Use of such a low frequency may be feasible due to the relatively low EM signal attenuation of the resistive layer. In some embodiments, the EM signal may have a wavelength that is about the same as a thickness of the resistive layer. For example, where the resistive layer is determined to have a thickness of about 30 m, the EM signal may be generated with a wavelength of about 30 m. Thus, for example, the EM signal may have a frequency of about 1 MHz and a wavelength of about 30 m.

Although certain embodiments are described in the context of a single EM signal being transmitted between a single EM transmitter-receiver pair for the purpose of illustration, similar techniques can be employed for the propagation of the EM signal from a single EM transmitter to other EM receivers. For example, with regard to an EM signal transmitted into a resistive layer by a single EM transmitter, a determination regarding substances located along the respective paths between the EM transmitter and each of multiple EM receivers can be made to generate a high-resolution mapping of the reservoir that indicates the location of various substance, such as pockets of by-passed oil and/or pockets of injected water. A similar process can be repeated for any number of EM transmitters to generate data for paths between any number of EM transmitters and receivers to provide information regarding the presence of substances across an entire field, for example.

In some embodiments, contrast agents are mixed with substances, such as slugs of water injected into a reservoir, to provide unique EM signatures that enable different substances to be distinguished from one another using the EM detection techniques described herein. The substances having contrast agents added thereto may be referred to as "labeled" substances. The contrast agents can include particles, colloids, emulsions, polymers, salts, or molecules and/or the like. The contrast agents can include, for example, magnetic contrast agents, such as magnetic nanoparticles (referred to as magnetic nano-mappers (MNMs)), high dielectric nanoparticles, and/or the like. In some embodiments, the contrast agents can include substances that modify magnetic permeability ($\mu$), electric permittivity ($\epsilon$) and/or conductivity ($\sigma$) of the base substance (e.g., water). In some embodiments, the contrast agents modulate one or more parameters (e.g., permeability ($\mu$), electric permittivity ($\epsilon$) and/or conductivity ($\sigma$)) of the labeled substance by at least a given percentage (e.g., 5% or more), or a given factor (e.g., a factor of 2 or more, or even a factor of 10 or more) to enhance the resulting "contrast" of the labeled substance. The contrast agents may serve as electromagnetic contrast agents that alter the speed of nearby EM signals, thereby facilitating detection of the location and/or identity of the labeled substances within the reservoir. Similar to the effect of other substances, such as oil and water present in the conductive layers, the magnetic signature of the contrast agents present in the conductive layers can alter the velocity of an EM signal as it travels through the resistive layer. In some embodiments, different slugs of water are each "labeled" with respective sets of contrast agents that each have a different magnetic signatures. As a result, the locations and identity of the labeled slugs of water can be determined based on the observed travel times of EM signals. For example, a first slug of water may be labeled with a first set of contrast agents that induce a first level of delay in EM signals, a second slug of water may be labeled with a second set of contrast agents that induce a second level of delay in EM signals, and so forth. EM signals can be transmitted between one or more EM transmitter-receiver pairs via one or more resistive layers of a reservoir, and the respective travel times can be used to identify the location and identity of the first slug of water, the location and identity of the second slug of water and so forth.

Provided in some embodiments is a method for mapping a hydrocarbon reservoir. The method including: disposing an electromagnetic (EM) transmitter into a first wellbore of a first well penetrating a resistive layer of a subsurface formation, the EM transmitter being disposed at a depth corresponding to an intersection of the first wellbore and the resistive layer, the resistive layer being bounded by a first conductive layer located adjacent (e.g., above) the resistive layer and a second conductive layer located adjacent (e.g., below) the resistive layer; disposing an EM receiver into a second wellbore of a second well penetrating the resistive layer of the subsurface formation, the EM receiver being disposed at a depth corresponding to an intersection of the second wellbore and the resistive layer; activating the EM transmitter to transmit an EM signal into the resistive layer at the first wellbore such that the EM signal propagates from the EM transmitter disposed in the first wellbore to the EM receiver disposed in second wellbore via the resistive layer; activating the EM receiver to receive the EM signal at the second wellbore; determining, based on the EM signal received at the second wellbore, transport properties associated with propagation of the EM signal from the EM transmitter to the EM receiver via the resistive layer; and determining a presence of an anomaly in at least one of the first and second conductive layers based on the transport properties.

In some embodiments, the EM signal includes a frequency in the range of about 0.3 megahertz (MHz) to 3 MHz (e.g., a frequency of about 1 MHz). In certain embodiments, the method includes: determining a thickness of the resistive layer, and the EM signal includes a wavelength that corresponds to the thickness of the resistive layer determined. In some embodiments, the EM signal includes a wavelength that is less than about 100 m. In certain embodiments, the EM signal includes a broadband pulse (e.g., direct current (DC) pulse) or a modulated alternating current (AC) signal.

In some embodiments, a first location of the EM transmitter disposed in the first wellbore and a second location the EM receiver disposed in the second wellbore are separated by a distance greater than about 1000 m.

In certain embodiments, the first wellbore includes a first open hole portion at the intersection of the first wellbore and the resistive layer, disposing the EM transmitter into the first wellbore includes disposing the EM transmitter in the first open hole portion of the first wellbore, the second wellbore includes a second open hole portion at the intersection of the second wellbore and the resistive layer, and disposing the EM receiver into the second wellbore includes disposing the EM receiver in the second open hole portion of the second wellbore.

In some embodiments, the EM transmitter includes a first antenna disposed in the first wellbore at a location proximate a portion of the resistive layer penetrated by the first wellbore, and the EM receiver includes a second antenna disposed in the second wellbore at a location proximate a portion of the resistive layer penetrated by the second wellbore.

In certain embodiments, the EM transmitter includes: a first conductive casing string disposed in the first wellbore, the first conductive casing string extending from a first wellhead and terminating proximate the intersection of the first wellbore and the resistive layer; and a first EM solenoid electrically coupled to the first conductive casing string via the first wellhead, and activating the EM transmitter to transmit an EM signal into the resistive layer at the first wellbore includes activating the first EM solenoid to generate an EM signal that is transmitted into the resistive layer via the first conductive casing string. In some embodiments, the first conductive casing string terminates below the intersection of the first wellbore and the resistive layer. In certain embodiments, the EM receiver includes: a second conductive casing string disposed in the second wellbore, the second conductive casing string extending from a second wellhead and terminating proximate the intersection of the second wellbore and the resistive layer; and a second EM solenoid electrically coupled to the second conductive casing string via the second wellhead, and activating the EM receiver to receive the EM signal at the second wellbore includes activating the second EM solenoid to receive the EM signal via the second conductive casing string. In some embodiments, the second conductive casing string terminates below the intersection of the second wellbore and the resistive layer.

In certain embodiments, the transport properties include a travel time associated with propagation of the EM signal from the EM transmitter to the EM receiver via the resistive layer and determining a presence of an anomaly in at least one of the first and second conductive layers based on the transport properties includes: determining a velocity for the EM signal based on the travel time; and determining a presence of an anomaly in at least one of the first and second conductive layers based on the velocity. In some embodiments, the anomaly includes a pocket of oil or a pocket of water in at least one of the one of the first and second conductive layers. In certain embodiments, the transport properties include a travel time associated with propagation of the EM signal from the EM transmitter to the EM receiver via the resistive layer, and determining a presence of an anomaly in at least one of the first and second conductive layers based on the transport properties includes: determining a relatively high velocity for the EM signal based on the travel time; and determining a presence of oil in at least one of the first and second conductive layers based on the relatively high velocity. In some embodiments, the transport properties include a travel time associated with propagation of the EM signal from the EM transmitter to the EM receiver via the resistive layer, and determining a presence of an anomaly in at least one of the first and second conductive layers based on the transport properties includes: determining a relatively low velocity for the EM signal based on the travel time; and determining a presence of water in at least one of the first and second conductive layers based on the relatively low velocity.

In certain embodiments, the method includes: disposing a second EM receiver into a third wellbore of a third well penetrating the resistive layer of the subsurface formation, the second EM receiver being disposed at a depth corresponding to an intersection of the third wellbore and the resistive layer; activating the second EM receiver to receive the EM signal at the third wellbore, the EM signal propagating from the EM transmitter to the second EM receiver via the resistive layer; determining second transport properties associated with propagation of the EM signal from the EM transmitter to the second EM receiver; and determining the presence of an anomaly in at least one of the first and second conductive layers based on the second transport properties and the transport properties associated with propagation of the EM signal from the EM transmitter to the EM receiver. In some embodiments, determining the presence of an anomaly in at least one of the first and second conductive layers based on the second transport properties and the transport properties associated with propagation of the EM signal from the EM transmitter to the EM receiver includes determining a boundary of an oil column in at least one of the first and second conductive layers. In certain embodiments, determining the presence of an anomaly in at least one of the first and second conductive layers based on the second transport properties and the transport properties associated with propagation of the EM signal from the EM transmitter to the EM receiver includes determining a boundary of a water pocket in at least one of the first and second conductive layers.

In certain embodiments, the method includes: determining the intersection of the first wellbore and the resistive layer based on a first well log for the first well; and determining the intersection of the second wellbore and the resistive layer based on a second well log for the second well.

In some embodiments, the resistive layer includes an anhydrite layer, the first conductive layer includes a first carbonate layer, and the second conductive layer includes a second carbonate layer. In certain embodiments, at least one of the first and second conductive layers includes strata of a hydrocarbon reservoir determined to comprise hydrocarbons.

In certain embodiments, the method includes: injecting, into the reservoir, a labeled slug of a substance having a first EM signature, the labeled slug of the substance including the substance and contrast agents defining the first EM signature, wherein the anomaly includes the labeled slug of the substance.

Provided in some embodiments is a non-transitory computer readable storage medium including program instructions executable by a computer processor to cause the operations of the method described above.

Provided in some embodiments is a system for mapping a hydrocarbon reservoir. The system including: an electromagnetic (EM) transmitter adapted to be disposed in a first wellbore of a first well penetrating a resistive layer of a subsurface formation, the EM transmitter adapted to be disposed at a depth corresponding to an intersection of the first wellbore and the resistive layer, the resistive layer being bounded by a first conductive layer located adjacent (e.g., above) the resistive layer and a second conductive layer located adjacent (e.g., below) the resistive layer; an EM receiver adapted to be disposed in a second wellbore of a second well penetrating the resistive layer of the subsurface formation, the EM receiver adapted to be disposed at a depth corresponding to an intersection of the second wellbore and the resistive layer; the EM transmitter adapted to transmit an EM signal into the resistive layer at the first wellbore such that the EM signal propagates from the EM transmitter disposed in the first wellbore to the EM receiver disposed in second wellbore via the resistive layer; the EM receiver adapted to receive the EM signal at the second wellbore; and a mapping system adapted to: determine, based on the EM signal received at the second wellbore, transport properties associated with propagation of the EM signal from the EM transmitter to the EM receiver via the resistive layer; and determine a presence of an anomaly in at least one of the first and second conductive layers based on the transport properties.

In some embodiments, the EM signal includes a frequency in the range of about 0.3 MHz to 3 MHz (e.g., about 1 MHz). In some embodiments, the EM signal includes a wavelength that corresponds to the thickness of the resistive layer. In certain embodiments, the EM signal includes a wavelength that is less than about 100 m. In some embodiments, the EM signal includes a broadband pulse or a modulated alternating current (AC) signal.

In certain embodiments, a first location of the EM transmitter disposed in the first wellbore and a second location the EM receiver disposed in the second wellbore are separated by a distance greater than about 1000 m. In some embodiments, the first wellbore includes a first open hole portion at the intersection of the first wellbore and the resistive layer, the EM transmitter is adapted to be disposed in the first open hole portion of the first wellbore, the second wellbore includes a second open hole portion at the intersection of the second wellbore and the resistive layer, and the EM receiver is adapted to be disposed in the second open hole portion of the second wellbore.

In some embodiments, the EM transmitter includes a first antenna adapted to be disposed in the first wellbore at a location adjacent a portion of the resistive layer penetrated by the first wellbore, and the EM receiver includes a second antenna adapted to be disposed in the second wellbore at a location adjacent to a portion of the resistive layer penetrated by the second wellbore. In certain embodiments, the EM transmitter includes: a first conductive casing string disposed in the first wellbore, the first conductive casing string extending from a first wellhead and terminating proximate the intersection of the first wellbore and the resistive layer; and a first EM solenoid electrically coupled to the first conductive casing string via the first wellhead, and the first EM solenoid is adapted to be activated to generate an EM signal that is transmitted into the resistive layer via the first conductive casing string. In some embodiments, the first conductive casing string terminates below the intersection of the first wellbore and the resistive layer.

In certain embodiments, the EM receiver includes: a second conductive casing string disposed in the second wellbore, the second conductive casing string extending from a second wellhead and terminating proximate the intersection of the second wellbore and the resistive layer; and a second EM solenoid electrically coupled to the second conductive casing string via the second wellhead, and the second EM solenoid is adapted to be activated to receive the EM signal via the second conductive casing string. In some embodiments, the second conductive casing string terminates below the intersection of the second wellbore and the resistive layer.

In certain embodiments, the transport properties include a travel time associated with propagation of the EM signal from the EM transmitter to the EM receiver via the resistive layer, and determining a presence of an anomaly in at least one of the first and second conductive layers based on the transport properties includes: determining a velocity for the EM signal based on the travel time; and determining a presence of an anomaly in at least one of the first and second conductive layers based on the velocity. In some embodiments, the anomaly includes a pocket of oil or a pocket of water in at least one of the one of the first and second conductive layers. In certain embodiments, the transport properties include a travel time associated with propagation of the EM signal from the EM transmitter to the EM receiver via the resistive layer, and determining a presence of an anomaly in at least one of the first and second conductive layers based on the transport properties includes: determining a relatively high velocity for the EM signal based on the travel time; and determining a presence of oil in at least one of the first and second conductive layers based on the relatively high velocity. In some embodiments, the transport properties include a travel time associated with propagation of the EM signal from the EM transmitter to the EM receiver via the resistive layer, and determining a presence of an anomaly in at least one of the first and second conductive layers based on the transport properties includes: determining a relatively low velocity for the EM signal based on the travel time; and determining a presence of water in at least one of the first and second conductive layers based on the relatively low velocity.

In certain embodiments, the system includes: a second EM receiver adapted to be disposed into a third wellbore of a third well penetrating the resistive layer of the subsurface formation, the second EM receiver adapted to be disposed at a depth corresponding to an intersection of the third wellbore and the resistive layer; the second EM receiver adapted to be activated to receive the EM signal at the third wellbore, the EM signal propagating from the EM transmitter to the second EM receiver via the resistive layer; the mapping system being further adapted to: determine second transport properties associated with propagation of the EM signal from the EM transmitter to the second EM receiver; and determine the presence of an anomaly in at least one of the first and second conductive layers based on the second transport properties and the transport properties associated with propagation of the EM signal from the EM transmitter to the EM receiver.

In some embodiments, determining the presence of an anomaly in at least one of the first and second conductive layers based on the second transport properties and the transport properties associated with propagation of the EM signal from the EM transmitter to the EM receiver includes determining a boundary of an oil column in at least one of the first and second conductive layers. In certain embodiments, determining the presence of an anomaly in at least one of the first and second conductive layers based on the second transport properties and the transport properties associated with propagation of the EM signal from the EM transmitter to the EM receiver includes determining a boundary of a water pocket in at least one of the first and second conductive layers.

In some embodiments, the mapping system is further adapted to: determine the intersection of the first wellbore and the resistive layer based on a first well log for the first well; and determine the intersection of the second wellbore and the resistive layer based on a second well log for the second well.

In certain embodiments, the resistive layer includes an anhydrite layer, the first conductive layer includes a first carbonate layer, and the second conductive layer includes a second carbonate layer. In some embodiments, at least one of the first and second conductive layers includes strata of a hydrocarbon reservoir determined to comprise hydrocarbons.

Provided in some embodiments is a non-transitory computer readable medium comprising program instructions stored thereon for mapping a hydrocarbon reservoir. The program instructions being executable by a processor to perform the following operations: activating an electromagnetic (EM) transmitter to transmit an EM signal into a resistive layer a subsurface formation at a first wellbore such that the EM signal propagates from the EM transmitter to an EM receiver disposed in a second wellbore via the resistive layer, the EM transmitter being disposed in a first wellbore of a first well penetrating the resistive layer of the subsurface formation, the EM transmitter being disposed at a depth corresponding to an intersection of the first wellbore and the resistive layer, and the resistive layer being bounded by a first conductive layer located adjacent the resistive layer and a second conductive layer located adjacent the resistive layer; activating an EM receiver to receive the EM signal at the second wellbore, the EM receiver being disposed in a second wellbore of a second well penetrating the resistive layer of the subsurface formation, the EM receiver being disposed at a depth corresponding to an intersection of the second wellbore and the resistive layer; determining transport properties associated with propagation of the EM signal from the EM transmitter to the EM receiver via the resistive layer; and determining a presence of an anomaly in at least one of the first and second conductive layers based on the transport properties.

Figure 1A:
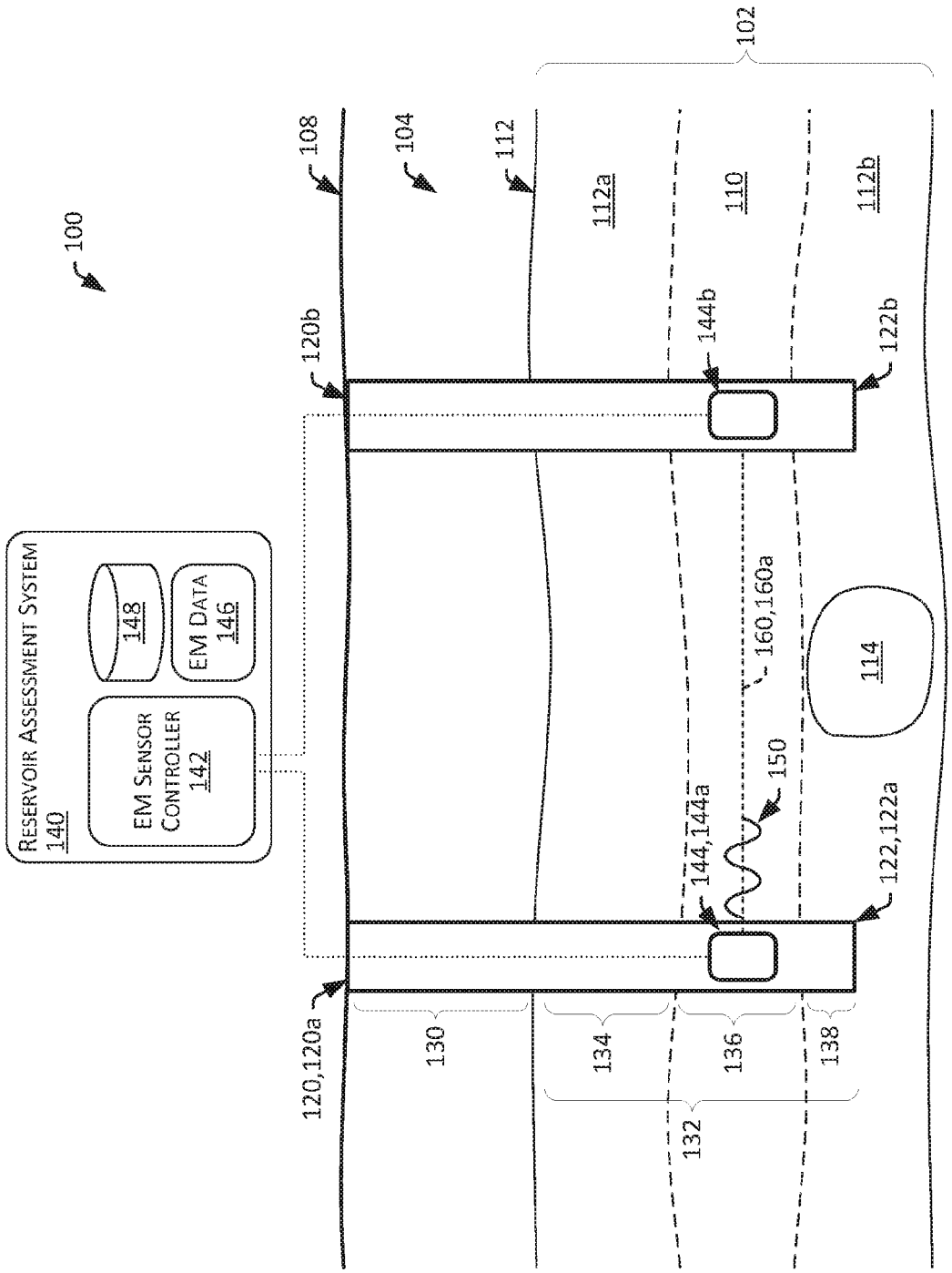
FIGS. 1A-1C are diagrams that illustrates a reservoir environment in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed descriptions are not intended to limit the disclosure to the particular form disclosed, but, to the contrary, the intention is to cover all modifications, equivalents, and alternatives falling within the spirit and scope of the present disclosure as defined by the claims.

DETAILED DESCRIPTION

The present invention will now be described more fully hereinafter with reference to the accompanying drawings in which example embodiments of the invention are shown. This invention may, however, be embodied in many different forms and should not be construed as limited to the illustrated embodiments set forth herein, rather, these example embodiments are provided so that this disclosure will be thorough and complete, and will fully convey the scope of the invention to those skilled in the art.

Described herein are systems and methods for mapping reservoirs using electromagnetic (EM) transmissions. In some embodiments, a naturally occurring planar transmission line of a reservoir is employed for the transmission of EM signals for use in determining locations substances (e.g., hydrocarbons and fluids) in the reservoir.

Applicants have recognized that the velocity of an EM signal can be influenced by the properties of the medium that it propagates through, and that the velocity of an EM signal propagating through a medium bounded by other mediums can be influenced by the properties of the adjacent (or "bounding") mediums. For example, in the case of a relatively resistive layer (or "resistive layer") of a reservoir that is sandwiched between two relatively conductive layers (or "conductive layers") (e.g., an anhydrite layer that is sandwiched between two carbonate layers of the reservoir), the velocity of an EM signal propagating through the resistive layer can be influenced by the properties of the two conductive layers. Consistent with the premise that increasing relative electric permittivity ($\epsilon_r$) decreases EM signal velocity, Applicants have recognized that an EM signal that propagates through the resistive layer with a relatively high velocity may indicate the presence of a substance having a relatively low permittivity, such as oil, in the conductive layers; and, in contrast, an EM signal that propagates through the resistive layer with a relatively low velocity may indicate the presence of a substance having a relatively high permittivity, such as water, in the conductive layers. The concept works similarly with changes in magnetic permeability ($\mu$). Consistent with this, Applicants have also recognized that the location and types of substances present in the portions of the conductive layers located adjacent (e.g., above and/or below) a path through a resistive layer can be determined based on a total travel time required for an EM signal to propagate across the path. For example, where a travel time for an EM signal is relatively short, it can be determined that an oil pocket is present in the portions of the conductive layers located adjacent a path through the resistive layer that extends between an EM transmitter and an EM receiver used to generate and receive the EM signal; and, in contrast, where the travel time for an EM signal is relatively long, it can be determined that a water pocket is present in the portions of the conductive layers located adjacent a path through the resistive layer that extends between an EM transmitter and an EM receiver used to generate and receive the EM signal.

Although certain embodiments are described in the context of using recorded data to determine transport properties, such as "travel-time", that can be in-turn, used to determine properties of a medium between a transmitter and a receiver for the purpose of illustration, embodiments can include any suitable techniques for determining characteristics of the EM signal. In some embodiments, travel-time inversion is employed to determine the travel-time and associated EM signal characteristics. In some embodiments, full-waveform inversion is employed to determine the size location, location and properties of an electromagnetic anomaly in the medium (e.g., in the reservoir rock) between a transmit (TX vector) and the receive (RX) vector. In such an embodiment, full waveform data (e.g., every shot or trace) may be recorded. In some embodiments, several shots and/or traces are stacked and/or averaged, for example, if data rates exceed transmission capabilities for real-time shot single shot data. The resulting data may be processed and/or displayed in real-time. In some embodiments, the data is processed "offline" using recorded data.

FIG. 1A is a diagram that illustrates a reservoir environment 100 in accordance with one or more embodiments. In some embodiments, the reservoir environment 100 includes a petroleum reservoir ("reservoir") 102 located in a subsurface formation ("formation") 104, and a production system 106 for producing hydrocarbons from the reservoir 102.

The formation 104 may include porous or fractured rock formations that reside beneath the earth's surface 108 (e.g., underground). The reservoir 102 may include (or at least be determined or expected to include) a subsurface pool of hydrocarbons (e.g., a pool of oil and/or gas) contained in porous or fractured rock of the formation 104. In some instances, the reservoir 102 may include different layers of rock that have varying characteristics, including varying degrees of permeability, porosity, resistivity, and/or the like. In the illustrated embodiment, for example, the reservoir 102 includes a resistive layer 110 bounded above and below by adjacent conductive layers 112 (e.g., first and second conductive layers 112a and 112b, respectively). That is, the resistive layer 110 may be sandwiched between the two conductive layers 112a and 112b. The resistive layer 110 may have a relatively high resistivity (or relatively low conductivity) in comparison to other layers of the formation 104, including the first and second conductive layers 112a and 112b. The conductive layers 112 may have relatively high conductively (or relatively low resistivity) in comparison to other layers of the formation 104, including the resistive layer 110. In some embodiments, the resistive layer may have a resistivity in the range of about 0.002 to 0.0001 Siemens per meter (S/m). For example, the resistive layer may have a resistivity of about 0.0005 S/m. In some embodiments, the conductive layers 112a and 112b may each have a resistivity in the range of about 0.02 to 0.38 S/m. For example, the conductive layers 112a and 112b may each have a resistivity of about 0.02 S/m. In some embodiments, the resistive layer includes evaporates. For example, the resistive layer may include a layer formed of anhydrite, salt, gypsum, granite, basalt, quartzite and/or the like layers. In some embodiments, the resistive layer has a thickness that is less than about 300 m. For example, the resistive layer may have a thickness about 100 meters (m) or less. In some embodiments, the conductive layers 112 include a layer of the reservoir that contains (or is at least expected to contain) hydrocarbons. For example, one or both of the conductive layers 112a and 112b may include a layer formed of carbonate, sandstone and/or the like. In some embodiments, the conductive layers 112 include an anomaly 114, such as a pocket of oil, a pocket of water, or a pocket of another substance residing in the conductive layers 112.

In some embodiments, the production system 106 includes one or more wells 120 to facilitate extraction of hydrocarbons from the reservoir 102. For example, in the illustrated embodiment, the production system 106 includes a first well 120a and a second well 120b. In some embodiments, each of the wells 120 includes a wellbore that is drilled into the formation 104 and the reservoir 102. For example, in the illustrated embodiment, the first well 120a includes a first wellbore 122a that extends into the formation 104 and the reservoir 102 (e.g., into the first conductive layer 112a, the resistive layer 110 and/or the second conductive layer 112b), and the second well 120b includes a second wellbore 122b that extends into the formation 104 and the reservoir 102 (e.g., into the first conductive layer 112a, the resistive layer 110 and/or the second conductive layer 112b). In some embodiments, some or all of the portions of the wellbores 122 that intersect the first conductive layer 112a, the resistive layer 110 and/or the second conductive layer 112b may be open-holed (e.g., not including an annular casing) or cased (e.g., including an annular casing).

As illustrated, portions of the wellbores 122 may intersect the first conductive layer 112a, the resistive layer 110 and/or the second conductive layer 112b. For example, the first wellbore 122a may include a first segment (a "formation intersection segment") 130 that intersects the portion of the formation 104 above the reservoir 102 (e.g., extending from a surface 108 to the top surface of the reservoir 102), and a second segment (a "reservoir intersection segment") 132 that intersects at least a portion of the reservoir 102 (e.g., extending downward from the top surface of the reservoir 102). The reservoir intersection segment 132 may include a third segment (a "first conductive layer intersection segment") 134 that intersects the first conductive layer 112a (e.g., extending from the top surface of the first conductive layer 112a to the bottom surface of the first conductive layer 112a), a fourth segment (a "resistive layer intersection segment") 136 that intersects the resistive layer 110 (e.g., extending from the top surface of the resistive layer 110 to the bottom surface of the conductive layer 112a), and/or a fifth segment (a "second conductive layer intersection segment") 138 that intersects the second conductive layer 112b (e.g., extending from the top surface of the second conductive layer 112b at least partially into the second conductive layer 112b). Other wellbores 122 of other wells 120, such as the second wellbore 122a of the second well 120b, may include similar wellbore segments.

In some embodiments, the wells 120 include production and/or injection wells. A production well may be designed to bring hydrocarbons to the surface from the reservoir 102. For example, a production well may include a wellbore 122 that is drilled into the formation 104 and the reservoir 102 to provide a path for extraction of hydrocarbons from the reservoir 102. An injection well may be designed to provide for injection of substances, such as water or gas, into the formation 104 and/or the reservoir 102. For example, an injection well may include a wellbore 122 that is drilled into the formation 104 and the reservoir 102 to provide a path for injecting substances, such as water and gas, into the reservoir 102. The injection may be employed to generate pressure in the reservoir to urge the hydrocarbons trapped in the conductive layers 112 of the reservoir 102 to move toward and into the wellbores 122 of productions wells.

In some embodiments, the production system 106 includes a reservoir assessment system 140 to provide for monitoring the reservoir 102 and optimizing extraction of hydrocarbons from the reservoir 102. In some embodiments, the reservoir assessment system 140 includes an EM system controller 142 and EM sensors 144. The EM system controller 142 may provide for collection of EM data 146 from the EM sensors 144 and processing of the EM signal data 146 to assess various characteristics of the reservoir 102, including the location of substances, such as oil and water, in the reservoir 102. In some embodiments, the EM data 146 and/or the results of the processing (e.g., a mapping of the reservoir 102) may be stored in a memory, such as a database 148. In some embodiments, the EM system controller 142 includes a computer system (e.g., that is the same or similar to computer system 1000, described below) for performing some or all of the operations described herein, including those described with regard to the EM system controller 142.

In the illustrated embodiment, the EM sensors 144 include a first EM sensor 144a disposed in the first wellbore 122a of the first well 120a, and a second EM sensor 144a disposed in the second wellbore 122a of the second well 120a. In some embodiments, EM sensors 144 can include (or at least be operated as) an EM transmitter and/or an EM receiver. For example, the first EM sensor 144a may include an EM transmitter configured to generate an EM signal 150 that is radiated into the resistive layer 110 of the reservoir 102, and the second EM sensor 144b may include an EM receiver configured to receive the EM signal 150 via propagation through the resistive layer 110 of the reservoir 102. In some embodiments, an EM sensor 144 may be an EM transceiver that can be configured to operate as an EM transmitter in a first mode of operation and to operate as an EM receiver in a second mode of operation. For example, the first EM sensor 144a may be disposed in a portion of the first wellbore 122a proximate the resistive layer 110 (e.g., in or near resistive layer intersection segment 136) and the second EM sensor 144b may be disposed in a portion of the second wellbore 122a proximate the resistive layer 110 (e.g., in or near a resistive layer intersection segment of the second wellbore 122a). The EM system controller 142 may active the first EM sensor 144a to generate an EM signal 150 that is radiated into the resistive layer 110, and active the second EM sensor 144b to sense the EM signal 150. The generated EM signal 150 may propagate through the resistive layer 110 to the second EM sensor 144b via an EM signal path 160 (e.g., first EM signal path 160a), and the second EM sensor 144b may sense the arrival of the EM signal 150. As described herein, the EM system controller 142 may determine a corresponding travel time for the EM signal 150, and use that travel time to determine substances present between the first and second EM sensors 144a and 144b In the illustrated embodiment, the EM sensors 144a and 144b are located in the resistive layer 110 (e.g., in the resistive layer intersection segment 136 of the wellbore 122a). In some embodiments, the EM sensors 144a and/or 144b can be located in a position proximate the resistive layer 110 (e.g., within about 10 m of the top or bottom surface of the resistive layer 110) that facilitates radiation of the EM signal 150 into the resistive layer 110 and/or receipt of the a propagated EM signal 150 from the resistive layer 110. For example, an EM sensor 144 may be located in a portion of the first conductive layer intersection segment proximate the resistive layer 110 (e.g., within about 10 m of the top surface of the resistive layer 110), in the resistive layer intersection segment (e.g., in the top, center or bottom portion of the resistive layer intersection segment), or in a portion of the second conductive layer intersection segment proximate the resistive layer 110 (e.g., within about 10 m of the bottom surface of the resistive layer 110). In some embodiments, the EM sensors 144 are disposed in open-hole (uncased) portions of the wellbores 122. For example, the EM sensors 144a and/or 144b may be disposed at depth that is below the termination of a casing string of the respective wellbores 122a and 122b.

In some embodiments, a travel time corresponding to a total time for an EM signal to travel from one EM sensor 144 (e.g., an EM transmitter) to another EM sensor 144 (e.g., an EM receiver) is determined, and the travel time is used to determine the presence of substances located in the portions of the conductive layers 112 proximate the path 160 between the EM sensors 144. For example, the EM system controller 142 may determine a travel time for the EM signal 150 to travel from the first EM sensor 144a to the second EM sensor 144b based on a difference between a time when the EM signal 150 is generated at the first EM sensor 144a (the "signal generation time") and a time when the EM signal 150 is received at the second EM sensor 144b (e.g., the "signal receipt time"). That is the EM system controller 142 may determine a travel time corresponding to the length of time for the EM signal to traverse the first path 160a through the resistive layer 110, between the first EM sensor 144a and the second EM sensor 144b. In some embodiments, the travel time can be used to determine a velocity of the EM signal 150. For example, a velocity of the EM signal 150 can be determined based on the distance between the first EM sensor 144a and the second EM sensor 144b (e.g., the length of the path 160a) divided by the travel time determined. If the EM system controller 142 determines that the travel time is relatively short (or the velocity of the EM signal 150 is relatively high), the EM system controller 142 may determine that a substance with a relatively low permittivity and/or permeability, such as oil, is present in portions of the conductive layer 112a and/or 112b located above and/or below the path 160a, respectively. In contrast, if the EM system controller 142 determines that the travel time is relatively long (or the velocity of the EM signal 150 is relatively low), the EM system controller 142 may determine that a substance with a relatively high permittivity and/or permeability, such as water, is present in portions of the conductive layer 112a and/or 112b located above and/or below the path 160a, respectively.

In some embodiments, the velocity of an EM signal 150 can be associated with a relative electric permittivity and/or relative permeability value that is indicative of the type of substances located in the conductive layers 112. In some embodiments, a signal velocity in a first range may be associated with a first relative electric permittivity associated with oil, a signal velocity in a second range may be associated with a second relative electric permittivity associated with a first slug of water of a first type, a signal velocity of in a third range may be associated with a third relative electric permittivity and relative permeability associated with a second slug of water of a second type. For example, a signal velocity of about 122389760 m/s may be associated with a first relative electric permittivity of about 6 associated with oil, a signal velocity of about 80122905 m/s may be associated with a second relative electric permittivity of about 14 and relative permeability of about 1.2 associated with a first slug of water of a first type, a signal velocity of about 65420078 m/s may be associated with a third relative electric permittivity of 14 and relative permeability of about 1.5 associated with a second slug of water of a second type. Thus, in response to the EM system controller 142 determining that the EM signal 150 across a path 160 has a velocity in the first range (e.g., a velocity of about 122389760 m/s), the EM system controller 142 may determine that oil is located in the portions of the conductive layers 112 proximate the path 160. In response to the EM system controller 142 determining that the EM signal 150 across a path 160 has a velocity in the second range (e.g., a velocity of about 80122905 m/s), the EM system controller 142 may determine that portions of the first slug of water are located in the portions of the conductive layers 112 proximate the path 160. In response to the EM system controller 142 determining that the EM signal 150 across a path 160 has a velocity in the third range (e.g., a velocity of about 65420078 m/s), the EM system controller 142 may determine that portions of the second slug of water are located in the portions of the conductive layers 112 proximate the path 160.

Figure 2A:
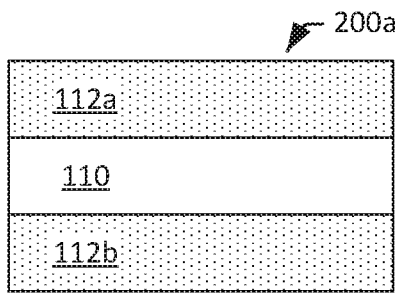
FIG. 2A-2F are diagrams that illustrate different reservoir scenarios in accordance with one or more embodiments.
Figure 2D:
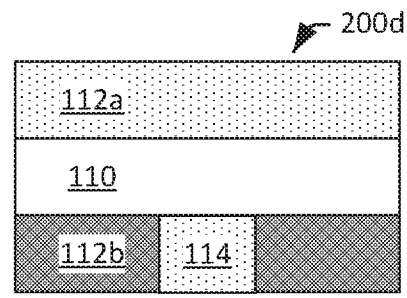
Figure 2B:
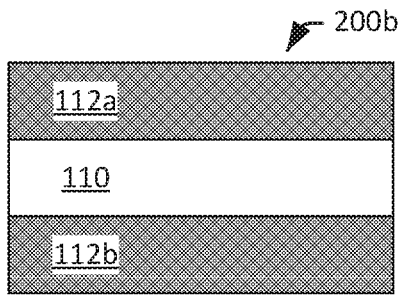
Figure 2E:
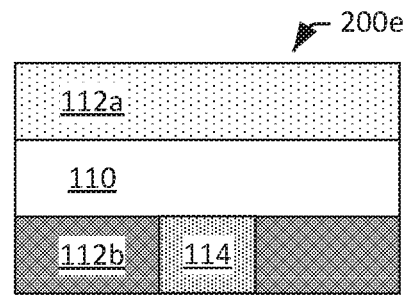
Figure 2C:
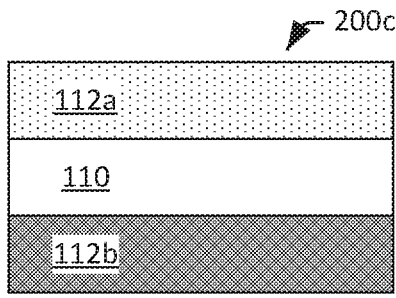
Figure 2F:
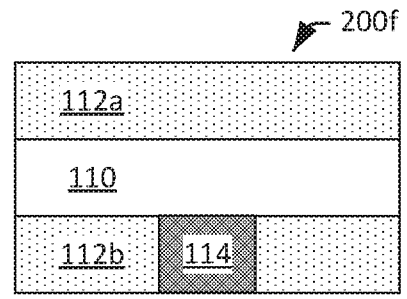
Figure 3A:
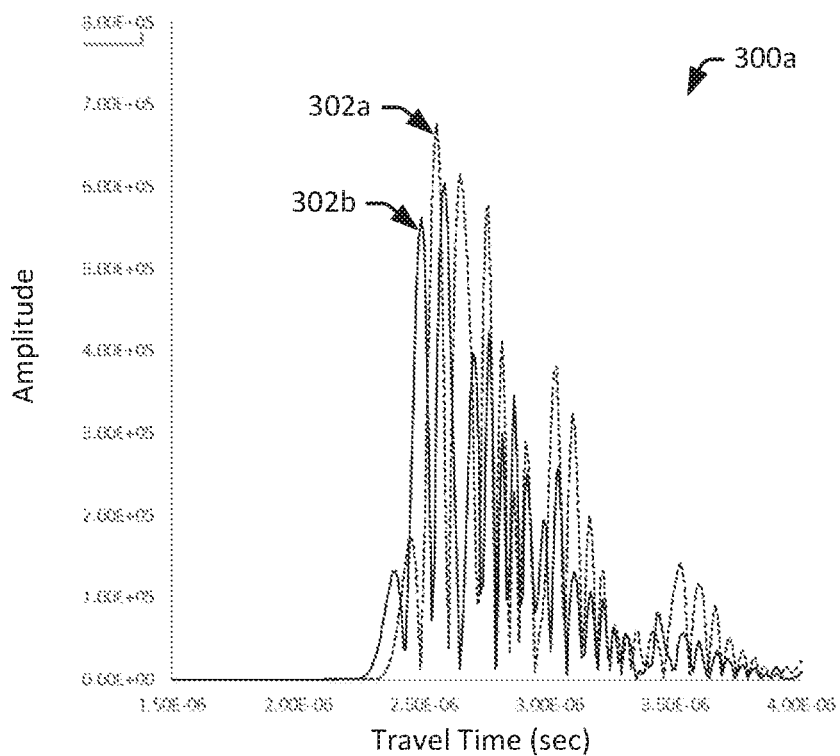
FIGS. 3A and 3C are plots that illustrate EM propagation times for different scenarios in accordance with one or more embodiments.

FIG. 2A-2F are diagrams that illustrate different reservoir scenarios in accordance with one or more embodiments. FIGS. 3A and 3C are plots that illustrate EM propagation times for different scenarios in accordance with one or more embodiments. FIG. 2A is a diagram 200a that illustrates a first scenario in which the first conductive layer 112a and the second conductive layer 112b are both water saturated (or "water-flooded") (e.g., each having a conductivity ($\sigma$) of about 0.38 S/m, a relative electric permittivity ($\epsilon_r$) of about 14 and a relative magnetic permeability ($\mu_r$) of about 1). FIG. 2B is a diagram 200b that illustrates a second scenario in which the first conductive layer 112a and the second conductive layer 112b are both oil saturated (e.g., each having a conductivity ($\sigma$) of about 0.02 S/m, a relative electric permittivity ($\epsilon_r$) of about 6 and a relative magnetic permeability ($\mu_r$) of about 1). FIG. 2C is a diagram 200c that illustrates a third scenario in which the first conductive layer 112a is water saturated (e.g., having a conductivity ($\sigma$) of about 0.38 S/m, a relative electric permittivity ($\epsilon_r$) of about 14 and a relative magnetic permeability ($\mu_r$) of about 1) and the second conductive layer 112b is oil saturated (e.g., having a conductivity ($\sigma$) of about 0.02 S/m, a relative electric permittivity ($\epsilon_r$) of about 6 and a relative magnetic permeability ($\mu_r$) of about 1). FIG. 2D is a diagram 200d that illustrates a fourth scenario in which the first conductive layer 112a is water saturated and the second conductive layer 112b is generally oil saturated, except for an anomaly 114 in the second conductive layer 112b that includes a pocket of a first slug of water (e.g., having a conductivity ($\sigma$) of about 0.38 S/m, a relative electric permittivity ($\epsilon_r$) of about 14 and a relative magnetic permeability ($\mu_r$) of about 1). FIG. 2E is a diagram 200e that illustrates a fifth scenario in which the first conductive layer 112a is water saturated and the second conductive layer 112b is generally oil saturated, except for an anomaly 114 in the second conductive layer 112b that includes a pocket of a second slug of water (e.g., having a conductivity ($\sigma$) of about 0.38 S/m, a relative electric permittivity ($\epsilon_r$) of about 80 and a relative magnetic permeability ($\mu_r$) of about 1). FIG. 2F is a diagram 200f that illustrates a sixth scenario in which a the first conductive layer 112a and the second conductive layer 112b are both water saturated, except for anomaly 114 in the second conductive layer 112b that includes a pocket of oil (e.g., having a conductivity ($\sigma$) of about 0.02 S/m, a relative electric permittivity ($\epsilon_r$) of about 6 and a relative magnetic permeability ($\mu_r$) of about 1).

FIG. 3A is a plot 300a that illustrates EM propagation times for the first and second scenarios of FIGS. 2A and 2B, respectively. The plot 300a includes a first curve 302a representing the travel time for an EM signal propagation through the resistive layer 110 of the first scenario of FIG. 2A, and a second curve 302b representing the travel time for an EM signal propagation through the resistive layer 110 (e.g., across a path between an EM transmitter located on one end/side of the resistive layer and an EM receiver located on the other end/side of the resistive layer 110) of the second scenario of FIG. 2B. Notably, the leftward shift of the second curve 302b and/or the rightward shift of the first curve 302a indicates a relatively short travel time (and higher EM signal velocity) for the second scenario and a relatively long travel time (and lower EM signal velocity) for the first scenario. It may be determined that the first scenario includes water saturated conductive layers 112a and 112b based on the longer travel time (and lower EM signal velocity) indicated by the first curve 302a. It may be determined that the second scenario includes oil saturated conductive layers 112a and 112b based on the shorter travel time (and higher EM signal velocity) indicated by the second curve 302b.

Figure 3B:
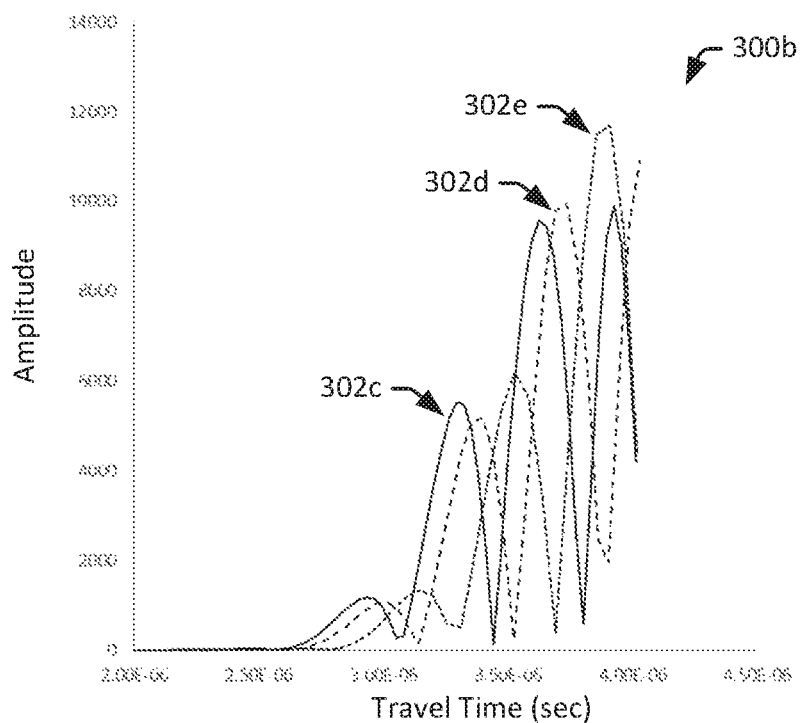
Figure 3C:
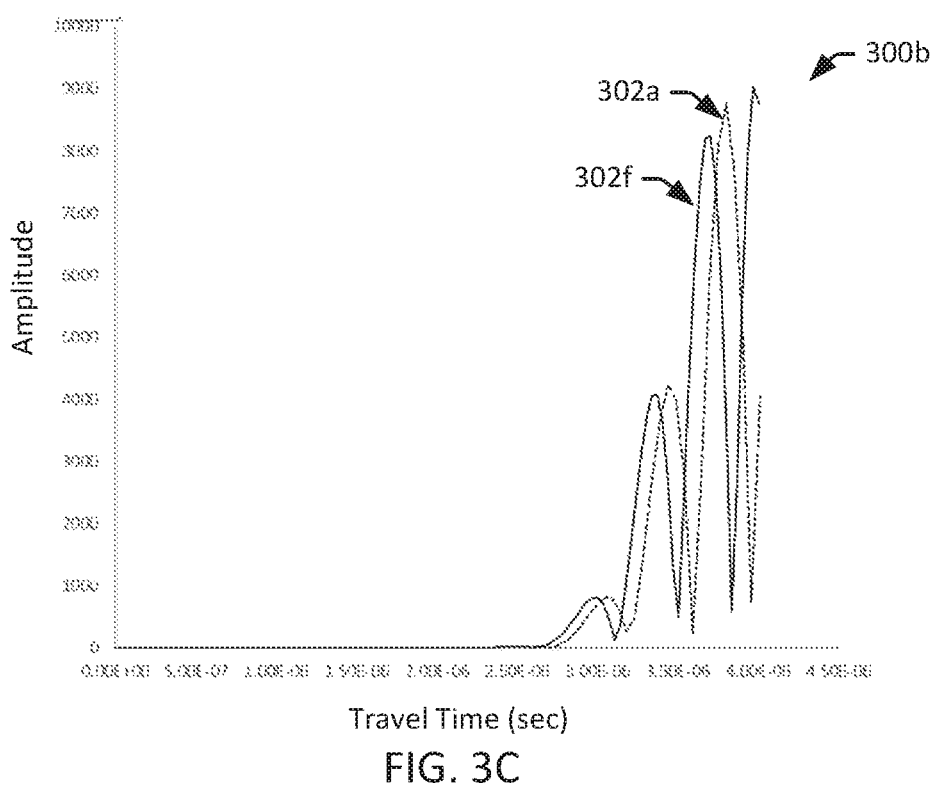

FIG. 3B is a plot 300b that illustrates EM propagation times for the third, fourth and fifth scenarios of FIGS. 2C, 2D and 2E, respectively. The plot 300b includes a third curve 302c representing the travel time for an EM signal propagation through the resistive layer 110 of the third scenario of FIG. 2C, a fourth curve 302d representing the travel time for an EM signal propagation through the resistive layer 110 of the fourth scenario of FIG. 2D, and a fifth curve 302e representing the travel time for an EM signal propagation through the resistive layer 110 of the fifth scenario of FIG. 2E. Notably, the leftward shift of the third curve 302c and/or rightward shift of the fifth curve 302e indicates a relatively short travel time (and higher EM signal velocity) for the third scenario, a relatively moderate travel time (and moderate EM signal velocity) for the fourth scenario, and a relatively long travel time (and lower EM signal velocity) for the fifth scenario. It may be determined that the third scenario includes one of the conductive layers 112a and 112b being water saturated and the other of the conductive layers 112a and 112b being oil saturated, based on the shorter travel time (and higher EM signal velocity) indicated by the third curve 302c. It may be determined that the fourth scenario includes one of the conductive layers 112a and 112b being water saturated and the other of the conductive layers 112a and 112b being oil saturated and including a pocket of the first slug of water, based on the moderate travel time (and moderate EM signal velocity) indicated by the fourth curve 302d. It may be determined that the fifth scenario includes one of the conductive layers 112a and 112b being water saturated and the other of the conductive layers 112a and 112b being oil saturated and including a pocket of the second slug of water, based on the long travel time (and lower EM signal velocity) indicated by the fifth curve 302e.

FIG. 3C is a plot 300c that illustrates EM propagation times for the first and sixth scenarios of FIGS. 2A and 2F, respectively. The plot 300c includes a portion of the second curve 302b representing the travel time for an EM signal propagation through the resistive layer 110 of the first scenario of FIG. 2A, and a sixth curve 302f representing the travel time for an EM signal propagation through the resistive layer 110 of the sixth scenario of FIG. 2F. Notably, the leftward shift of the sixth curve 202f and/or rightward shift of the portion of the second curve 302b indicates a relatively short travel time (and higher EM signal velocity) for the sixth scenario, and a relatively long travel time (and lower EM signal velocity) for the second scenario. It may be determined that the sixth scenario includes both of the conductive layers 112a and 112b being water saturated, with one of the conductive layers 112a or 112b including a pocket of oil, based on the shorter travel time (and higher EM signal velocity) indicated by the sixth curve 302d.

In some embodiments, an EM sensor 144 includes an EM sensor that is capable of being lowered into and removed from a wellbore 122. For example, referring to FIG. 1, the first EM sensor 144a and/or the second EM sensor 144b may include an EM sensor unit that is lowered into and retrieved from the respective wellbores 122a and/or 122b via a wireline. In some embodiments, an EM sensor 144 can be integrated with one or more downhole tools. For example, the first EM sensor 144a and/or the second EM sensor 144b may include an EM sensor unit that is integrated within and/or connected to a logging tool that is lowered into and retrieved from the respective wellbores 122a and/or 122b via a wireline.

Figure 1B:
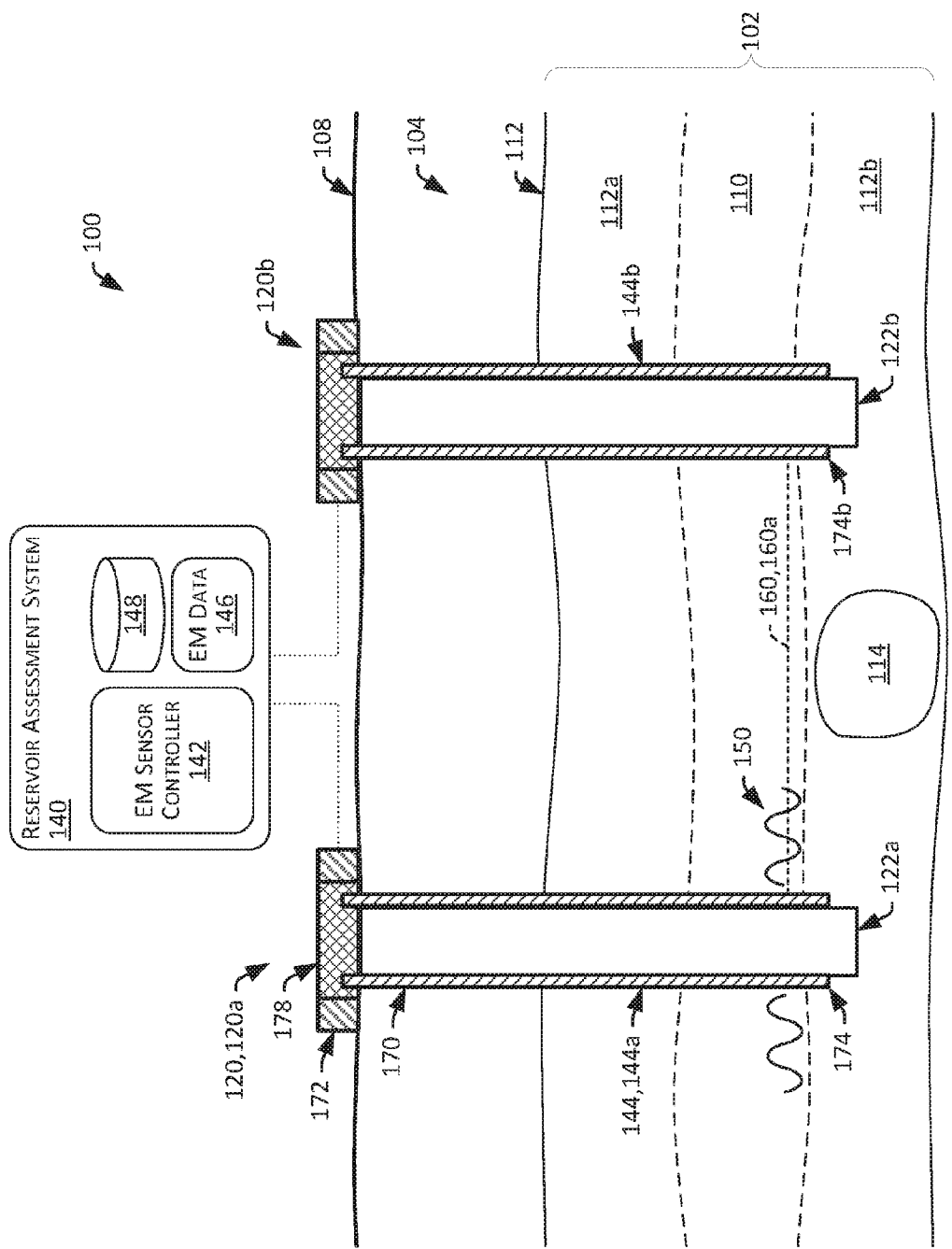
Figure 1C:
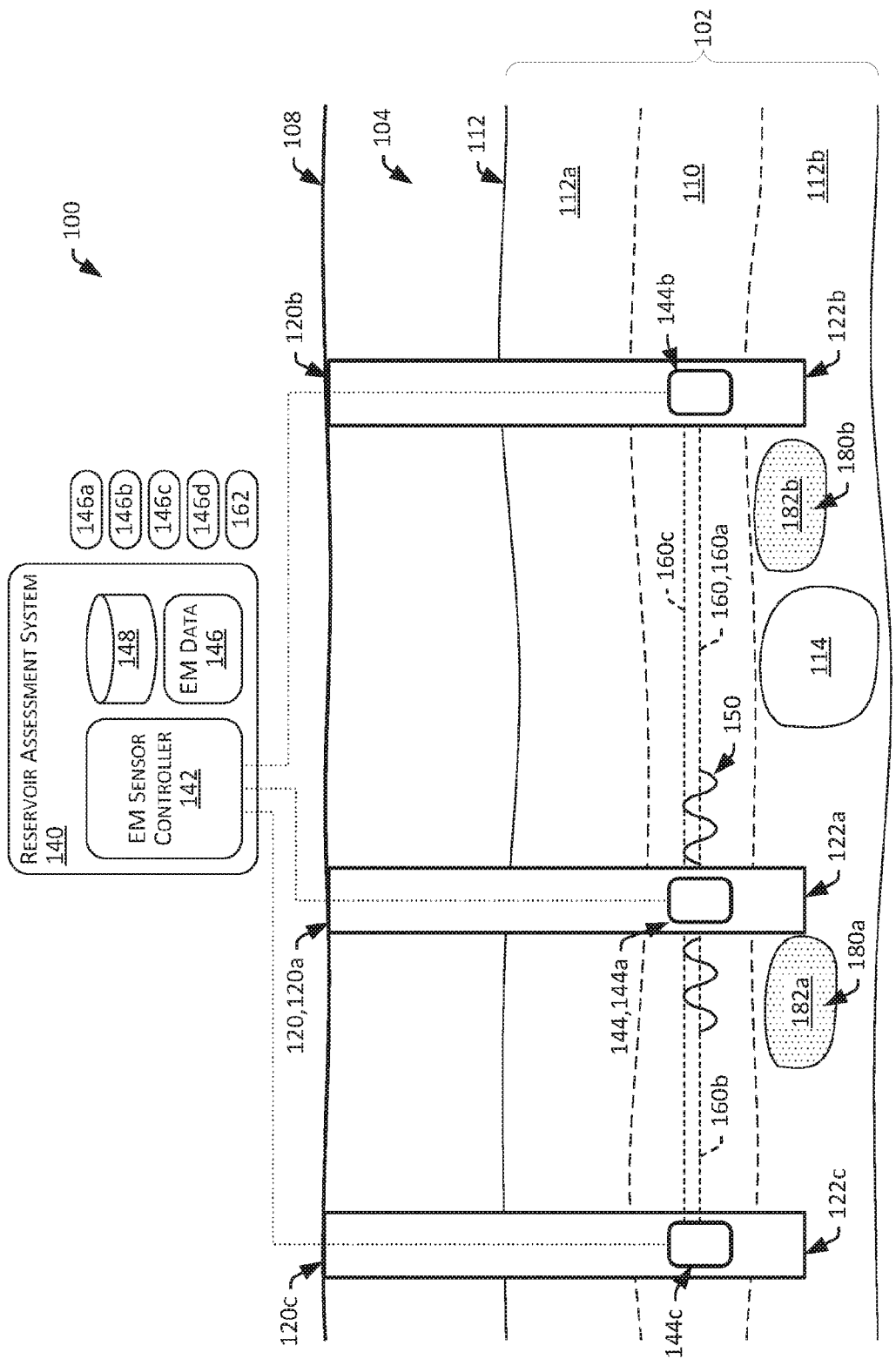

In some embodiments, an EM sensor 144 includes a conductive casing string of a well 120. For example, the first EM sensor 144a and/or the second EM sensor 144b may include an EM solenoid coupled to a conductive casing string (e.g., formed of steel, and/or the like conductive materials) that serves as an antenna for directing an EM signal into the resistive layer 110 and/or receiving an EM signal propagated via the resistive layer 110. FIG. 1B is a diagram that illustrates EM sensors 144 employing casing strings in accordance with one or more embodiments. A casing string 170 may include, for example, an EM solenoid 172 for generating and/or receiving EM signals. In the illustrated embodiment, the first EM sensor 144a includes a casing string 170 and an EM solenoid 172. The casing string 170 extends along a length of the wellbore 122a, from the surface 108 to a casing termination location 174 proximate the resistive layer 110 (e.g., in the resistive layer intersection segment 136 of the wellbore 122a or within about 5 m of the top or bottom surface of the resistive layer 110). In the illustrated embodiment, the termination location 174 is located in the resistive layer 110 (e.g., in the resistive layer intersection segment 136 of the wellbore 122a). In some embodiments, the termination location 174 can be located in the wellbore 122a at a depth that facilitates radiation of the EM signal 150 from the casing string 170 into the resistive layer 110 and/or receipt of the a propagated EM signal 150 from the resistive layer 110 via the casing string 174 (e.g., within about 5 m of the top or bottom surface of the resistive layer 110). In some embodiments, other wells 120 may include similar EM sensors 144 employing casing strings. For example, in the illustrated embodiment, the second EM sensor 144b includes a casing string 170 and an EM solenoid 172 having a similar configuration to that described with regard to the first EM sensor 144a.

In some embodiments, the EM solenoid 172 is magnetically coupled to an upper end 176 of the casing string 170, at or near the surface 108. For example, the EM solenoid 172 may include an electromagnetic coil (e.g., a collar) disposed about the perimeter of the upper end of the casing string 170 such that it can be electromagnetically coupled the upper end of the casing string 170. In an embodiment in which the well 102 includes a wellhead 178 mechanically and/or electromagnetically coupled to the upper end of the casing string 170, the EM solenoid 172 may include an electromagnetic coil (e.g., a collar) disposed about the perimeter of the wellhead 178 such that it can be electromagnetically coupled to the upper end of the casing string 170 via the wellhead 178. In the case of an EM sensor 144 employing a casing string being operated as an EM transmitter (e.g., as described with regard to EM sensor 144a in some embodiments), the EM solenoid 172 can be activated to generate an EM signal that travels down through the length of the casing string 170, and that is radiated into the resistive layer 110. For example, the EM system controller 142 may drive a current through an electromagnetic coil of the EM solenoid 172 disposed about the perimeter of the wellhead 178, a resulting magnetic flux density vector (B-field) remains in the casing string 170 until it reaches a lower end of the casing string 170 (e.g., at or near the termination location 174) where it causes corresponding EM radiation, and at least a portion of a resulting EM radiation propagates through the resistive layer as the EM signal 150. In the case of an EM sensor 144 employing a casing string being operated as an EM receiver (e.g., as described with regard to EM sensor 144b in some embodiments), the EM solenoid 172 can be activated to receive an EM signal that is received from the resistive layer 110, and travels up through the length of the casing string 170. For example, the EM system controller 142 may measure a current through an electromagnetic coil of the EM solenoid 172 disposed about the perimeter of the wellhead 178, and the measured current can be used to construct a representation of the EM signal 150 received at the lower end of the casing string 170 (e.g., at the termination location 174).

In some embodiments, an EM signal may have a frequency that is low enough to provide an extended range of detection, while being high enough to provide sufficient image resolution. In some embodiments, the EM signal 150 may have a frequency in the range of about 0.01 MHz to 10.0 MHz, or even in the narrower range of about 0.3 MHz to 3 MHz. For example, the EM system controller 142 may drive the EM sensor 144a to generate an EM signal 150 having a frequency of about 1 MHz. Such a frequency may provide for effective transmissions of more than 1000 m across the resistive layer 110, while providing image resolution in the order of 30-50 m. Use of such a frequency may be feasible due to the relatively low EM signal attenuation of the resistive layer 110. In some embodiments, the EM signal 150 may have a wavelength that is about the same as a thickness of the resistive layer 110. For example, where the EM system controller 142 determines that the resistive layer 110 has a thickness of about 30 m, the EM system controller 142 may drive the EM sensor 144a to generate an EM signal 150 having a wavelength of about 30 m. Thus, for example, the EM signal 150 may have a frequency of about 1 MHz and a wavelength of about 30 m. In some embodiments, the thickness of the resistive layer 110 may be determined as a thickness associated for with the resistive layer 110 across some or all of a field. For example, referring to FIG. 1, the thickness of the resistive layer 110 used in the determination of the wavelength for the EM signal 150 for the path 160a may be an average of the thickness of the resistive layer 110 across the field including the wells 120a and 120b, an average of the lengths of the resistive layer intersection segments in each of the wellbores 122a and 122b, and/or the like. The thickness of the resistive layer 110 may be determined, for example, based on seismic surveys of the field and/or well logs for wells 120 in the field. In some embodiments, the EM signal 150 comprises a broadband pulse or a modulated alternating current (AC) signal.

Although certain embodiments are described in the context of a single EM signal 150 being transmitted between a single pair of EM sensors 144 (e.g., from the EM sensor 144a to the EM receiver 144b) for the purpose of illustration, similar techniques can be employed for the propagation of the EM signal 150 between any number of different EM sensors 144. For example, similar EM detection operations can be conducted for different pairs of wells 120 across a field, and the resulting EM data 146 can be used to generate a mapping of the field. In some embodiments, the EM signal 150 generated by a single EM sensor 144 (operating as an EM transmitter) can be received by a plurality of different EM sensors 144 (operating as EM receivers), via respective paths 160 across the resistive layer 110. The travel time (or velocity) associated with each of the respective paths 160 between the EM sensors can be used to determine substances (e.g., oil or water) located in the portions of the conductive layers 112 adjacent the path 160. For example, referring to FIG. 1C, an additional (third) EM sensors 144c can be disposed proximate the resistive layer 110 in a third wellbore 122c of a third well 120c. When the EM sensor 144a is activated, the EM signal 150 may propagate through resistive layer 110, along the first path 160a to the second EM sensor 144b and along the second path 160b to the third EM sensor 122c. First EM data 146a indicative of the first travel time (or first velocity) of the EM signal 150 along the first path 160a can be used to determine substances (e.g., the first anomaly 114a) located proximate the first path 160a), and the second travel time (or second velocity) of the EM signal 150 along the first path 160a can be used to determine substances (e.g., a second anomaly 114b) located proximate the second path 160b. Although three EM sensors 144 are described for the purpose of illustration, any number of EM sensors 144 within range of the EM sensor 144a (e.g., within about 1 kilometer (km) of the EM sensor 144a) can receive the EM signal 150, and the corresponding EM data 146 can be used to determine substances (e.g., anomalies 114) located proximate each of the paths 160. This can create a "star-like" pattern of path 160 extending from an EM sensors 144 operating as an EM transmitter, to each of the EM sensors 144 in-range and operating as an EM receiver.

In some embodiments, some or all of the EM sensors 144 located in a region can each be operated as an EM transmitter (e.g., in an iterative fashion) while the other EM sensors 144 in-range are operated as EM receivers to generate EM data 146 for paths 160 extending from each EM sensor 144 to each of the other EM sensors 144 that are in-range. For example, the first EM sensor 144a may be operated as an EM transmitter while the second and third EM sensors 144b and 144c are operated as EM receivers to generate a first set of EM data 146a for the first path 160a between the first EM sensor 144a and the second EM sensor 144b, and a second set of EM data 146b for the second path 160b between the first EM sensor 144a and the third EM sensor 144c; then, the second EM sensor 144b may be operated as an EM transmitter while the first and third EM sensors 144a and 144c are operated as EM receivers to generate a third set of EM data 146c for the first path 160a between the second EM sensor 144b and the first EM sensor 144b and a fourth set of EM data 146d for a third path 160c (between the second EM sensor 144b and the third EM sensor 144c; and so forth. The EM data 146 for each of the paths 160 can be processed to identify substances located in the portions of the conductive layers 112 proximate the paths 160. The results can be combined to generate a high-resolution mapping of the reservoir 162 that indicates the location of various substance, such as pockets of by-passed oil and/or pockets of injected water.

In some embodiments, contrast agents are mixed with substances, such as slugs of water injected into the reservoir 102, to provide unique signatures (e.g., EM signatures) that enable different substances to be distinguished from one another using, for example, the EM detection techniques described herein. The substances having contrast agents added thereto may be referred to as "labeled" substances. The contrast agents can include particles, colloids, emulsions, polymers, salts, or molecules and/or the like. The contrast agents can include, for example, magnetic contrast agents, such as magnetic nanoparticles (referred to as magnetic nano-mappers (MNMs)), high dielectric nanoparticles, and/or the like. In some embodiments, the contrast agents can include substances that modify magnetic permeability ($\mu$), electric permittivity ($\epsilon$) and/or conductivity ($\sigma$) of the base substance (e.g., water). In some embodiments, the contrast agents modulate one or more parameters (e.g., permeability ($\mu$), electric permittivity ($\epsilon$) and/or conductivity ($\sigma$)) of the labeled substance by at least a given percentage (e.g., 5% or more), or a given factor (e.g., a factor of 2 or more, or even a factor of 10 or more) to enhance the resulting "contrast" of the labeled substance. The contrast agents may serve as EM contrast agents that alter the speed of nearby EM signals, thereby facilitating detection of the location and/or identity of the labeled substances within the reservoir 102. Similar to the effect of other substances, such as oil and water present in the conductive layers 112, the magnetic signature of the contrast agents present in the conductive layers 112 can alter the velocity of an EM signal 150 as it travels through the resistive layer 110. In some embodiments, different slugs of water are each "labeled" with respective sets of contrast agents that each have a different magnetic characteristics such that the slugs have respective magnetic signatures. For example, referring to FIG. 1C, a first set of contrast agents 180a having first EM characteristics may be mixed into a first slug of water 182a that is injected into the reservoir 102 via the first well 120a at a first time (e.g., April 2014) (such that the labeled first slug of water 182a has a first EM signature corresponding to the EM characteristics of the first set of contrast agents 180a) and a second set of contrast agents 180b having second EM characteristics may be mixed into a second slug of water 182b that is injected into the reservoir 102 via the second well 120b at a second time (e.g., May 2015) (such that the labeled second slug of water 182b has a second EM signature corresponding to the EM characteristics of the second set of contrast agents 180b). That is, the first slug of water 202a may be "labeled" with the first set of contrast agents 180a that alter nearby EM signals by a first degree, and the second slug of water 182b may be labeled with the second set of contrast agents 180b that alter nearby EM signals by a second degree that is different than the first degree. Similar to the discussion regarding identifying anomalies 114 of oil and different slugs of water based on travel times (or velocities) of the EM signals 150, the locations and identity of the labeled slugs of water 182 can be determined based on, for example, the observed travel times of EM signals 150 across paths 160 proximate the labeled slugs of water 182a and 182b in the reservoir 102. For example, where the first slug of water 182a has migrated into a portion of the second conductive layer 112b between the first well 120a and the third well 120c, the set of EM data 146b for the second path 160b may indicate and/or be processed to determine the that an anomaly 114 having EM properties consistent with the labeled first slug of water 182a is located in the portions of the conductive layers 212 proximate the second path 160b (e.g., between the location of the first well 120a and the third well 120c). Similarly, where the second slug of water 182b has migrated into a portion of the second conductive layer 112b between the first well 120a and the second well 120b, a set of EM data 146a for the first path 160a may indicate and/or be processed to determine the that an anomaly 114 having EM properties consistent with the labeled second slug of water 182b is located in the portions of the conductive layers 212 proximate the first path 160b (e.g., between the location of the first well 120a and the second well 120b). Thus, substances, such as slugs of water, can be labeled with contrast agents, the labeled substances can be injected into the reservoir 102, and the EM detection operations described herein can be used to locate and identify the labeled substances in the reservoir 102. Moreover, the EM detection techniques described herein can be repeated over time, e.g., annually, to track the migration of the labeled substances through the reservoir 102.

Figure 4:
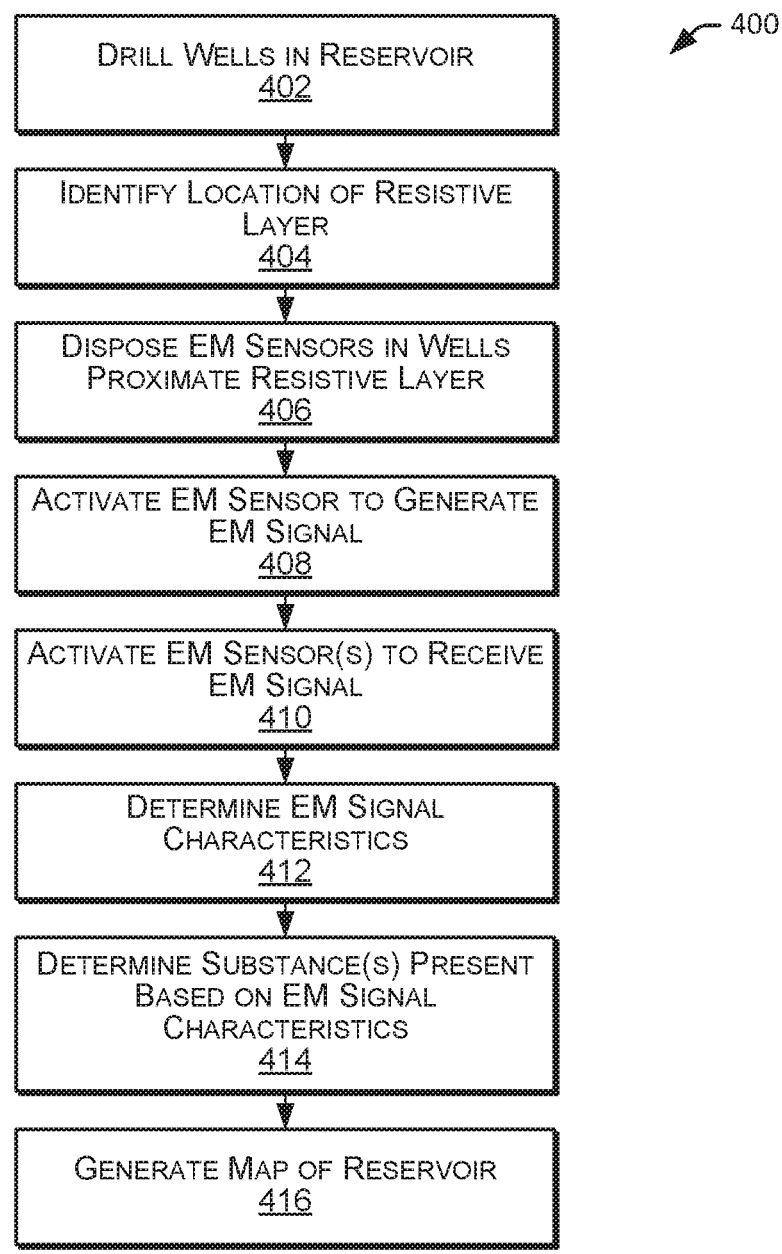
FIG. 4 is a flowchart diagram that illustrates a method for mapping a reservoir in accordance with one or more embodiments.

FIG. 4 is a flowchart diagram that illustrates a method 400 for mapping a reservoir in accordance with one or more embodiments. The method 400 may include drilling a plurality of wells in a reservoir (block 402), identifying a location of a resistive layer (block 404), disposing EM sensors in the wells proximate the resistive layer (block 406), activating an EM sensor to generate an EM signal (block 408), activating one or more EM sensors to receive the EM signal (block 410), determining EM signal characteristics (block 412), determining substances present based on the EM signal characteristics determined (block 414), and generating a mapping of the reservoir (block 416).

In some embodiments, drilling a plurality of wells in a reservoir (block 402) includes drilling at least two wells having wellbores that intersect a resistive layer of the reservoir. For example, drilling a plurality of wells in a reservoir may include drilling wells 120a, 120b and 120c that include wellbores 122a, 122b and 122c respectively, that intersect the resistive layer 110 of the reservoir 102. Although embodiments can include drilling a well and employing the techniques described herein for the drilled well, the techniques described herein can be employed for existing wells.

In some embodiments, identifying a location of a resistive layer (block 404) includes identifying a location of the resistive layer intersected by the plurality of wells drilled. For example, identifying a location of a resistive layer may include identifying the resistive layer intersection segments for each of the wellbores 122a and 122b. In some embodiments, the resistive layer intersection segment for a well 120 is determined via logging of the wellbore 122 of the well 120.

In some embodiments, disposing EM sensors in the wells proximate the resistive layer (block 406) includes disposing an EM sensor 122 in each of the wellbores 122, at or near the resistive layer intersection segment 136 for the wellbore 122. For example, disposing EM sensors in wellbores may include disposing the first EM sensor 144a downhole in the first resistive layer intersection segment 136 of the first wellbore 122a, disposing the second EM sensor 144b downhole in a second resistive layer intersection segment of the second wellbore 122b, and disposing a third EM sensor 144c downhole in a third resistive layer intersection segment of the third wellbore 122c. Where an EM sensor 144 includes a device that is lowered into the wellbore 122, disposing the EM sensor 144 into the wellbore 122 may include lowering the EM sensor 144 into a portion of the wellbore 122 proximate the resistive layer 110 (e.g., in the resistive layer intersection segment of the wellbore 122 or within about 10 m of the top or bottom surface of the resistive layer 110). Where an EM sensor 144 employs a casing string 170, disposing the EM sensor 144 into the wellbore 122 may include positioning the casing string 170 into the wellbore 122 with a termination location 174 proximate the resistive layer 110 (e.g., in the resistive layer intersection segment of the wellbore 122 or within about 10 m of the top or bottom surface of the resistive layer 110).

In some embodiments, activating an EM sensor to generate an EM signal (block 408) includes operating one of the EM sensors 144 as an EM transmitter to generate an EM signal 150 that radiates into, and propagates through, the resistive layer 110. For example, activating an EM sensor to generate an EM signal may include the EM system controller 142 driving a current through an electromagnetic coil of the first EM sensor 144a to generate an EM signal 150 that radiates into the resistive layer 110. In some embodiments, the EM signal 150 may have a frequency in the range of about 0.01 MHz to 10.0 MHz, or even in the narrower range of about 0.3 MHz to 3 MHz. For example, the EM system controller 142 may drive the EM sensor 144a with a current configured to generate an EM signal 150 having a frequency of about 1 MHz. In some embodiments, the EM signal 150 may have a wavelength that is about the same as a thickness of the resistive layer 110. For example, where the EM system controller 142 determines that the resistive layer 110 has a thickness of about 30 m, the EM system controller 142 may drive the EM sensor 144a with a current configured to generate an EM signal 150 having a wavelength of about 30 m. Thus, for example, the EM signal 150 may have a frequency of about 1 MHz and a wavelength of about 30 m. In some embodiments, activating an EM sensor to generate an EM signal includes conducting a frequency sweep. The frequency range of the sweep may, for example, include a frequency for generating an EM signal 150 having a wavelength that is about the same as a thickness of the resistive layer 110. For example, where the EM system controller 142 determines that the resistive layer 110 has a thickness of about 30 m, the EM system controller 142 may conduct a frequency sweep that includes driving the EM sensor 144a with different currents configured to generate a series of EM signals 150 having respective wavelengths in the range of about 750 kHz to about 1.25 MHz, including driving the EM sensor 144a to generate an EM signal 150 having a frequency of about 1 MHz and a wavelength of about 30 m.

In some embodiments, activating one or more EM sensors to receive an EM signal (block 410) includes operating one or more of the EM sensors 144 as an EM receiver to receive the EM signal 150 that propagates through the resistive layer 110. For example, activating one or more EM sensors to receive an EM signal may include the EM system controller 142 measuring a current through an electromagnetic coil of the second EM sensor 144b and/or the third EM sensor 144b, and using the measured currents to construct a representation of the EM signals 150 received at the second EM sensor 144b and/or the third EM sensor 144c. The EM system controller 142 may store, in the database 148, the measurements and/or the representations constructed as respective sets of EM data 146a and 146b for the respective paths 160a and 160b.

In some embodiments, determining EM signal characteristics (block 412) includes determining a travel time and/or a signal velocity for the EM signal(s) 150. For example, the EM system controller 142 may determine an EM signal generation time of 1:00:00 pm corresponding to a time at which the EM signal 150 was generated at the EM sensor 144a and an EM signal receipt time of 1:00:01 pm corresponding to a time at which the EM signal 150 was received at the EM sensor 144b, the EM system controller 142 may determine an EM signal travel time (or "EM signal delay") of about 1 second for the EM signal 150 based on the difference between the EM signal generation time and the EM signal receipt time, and, where the EM sensor 122a and the EM sensor 122b are separated by a distance of about 1000 m at the time of the EM signal transmission, the EM system controller 142 may determine an EM signal velocity of about 1000 m/s. It will be appreciated that the time basis above is used for the purpose of illustration, although in practice, the delays can be on the order of $1 \times 10^{-6}$ s or less, and the determined velocities may be much higher. In some embodiments, such a determination may be made for each EM signal received. For example, the EM system controller 142 may make a similar determination for the EM signal 150 received at the third EM sensor 144c across the second path 160b. Although certain embodiments are described in the context of "travel-time" for the purpose of illustration, embodiments can include any suitable techniques for determining characteristics of the EM signal. In some embodiments, travel-time inversion is employed to determine the travel-time and associated EM signal characteristics. In some embodiments, full-waveform inversion is employed to determine travel-time and associated EM signal characteristics. In such an embodiment, full waveform data (e.g., every shot or trace) may be recorded. In some embodiments, several shots and/or traces are stacked and/or averaged, for example, if data rates exceed transmission capabilities for real-time shot single shot data. The resulting data may be processed and/or displayed in real-time. In some embodiments, the data is processed "offline" using recorded data.

In some embodiments, determining substances present based on the EM signal characteristics determined (block 414) comprises determining a type of substance located in the conductive layers 112 proximate a path 160 between a pair of EM sensors 122 based on the EM signal characteristics for a signal 150 transmitted between the pair of EM sensors 122. For example, if the EM system controller 142 determines that the travel time of is relatively short (or the EM signal velocity of 1000 m/s is relatively high), the EM system controller 142 may determine that a substance with a relatively low permeability, such as oil, is present in portions of the conductive layer 112a and/or 112b located above and/or below the path 160a, respectively. In contrast, if the EM system controller 142 determines that the travel time of 1 s is relatively long (or the EM signal velocity of 1000 m/s is relatively low), the EM system controller 142 may determine that a substance with a relatively high permeability, such as water, is present in portions of the conductive layer 112a and/or 112b located above and/or below the path 160a, respectively. In some embodiments, such a determination may be made for each EM signal received. For example, the EM system controller 142 may make a similar determination for the EM signal 150 received at the third EM sensor 144c and across the second path 160b to determine relatively permeability of substances present in portions of the conductive layer 112a and/or 112b located above and/or below the path 160b.

Figure 5:
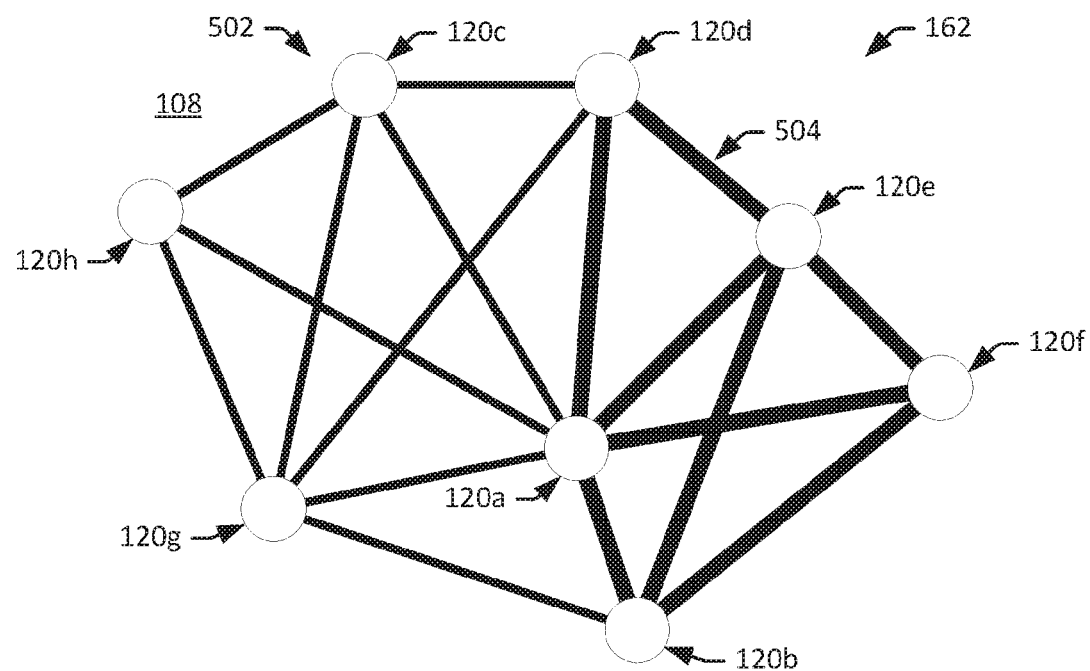
FIG. 5 is a diagram that illustrates a mapping of a reservoir in accordance with one or more embodiments.

In some embodiments, generating a mapping of the reservoir (block 416) includes generating a mapping of a field using the EM signal characteristics and relative permeability determined for multiple pairs of EM sensors 144. For example, the EM system controller 142 may generate a mapping of a field of wells 120 (e.g., including wells 120a, 120b and 120c) based on EM signal characteristics for paths 160 between some or all of the wells 120 of the field. FIG. 5 is a diagram that illustrates a mapping 162 of the reservoir 102 illustrating a field 502 of wells 120 (e.g., wells 120a-120h) in accordance with one or more embodiments. The mapping 162 may include a top-view of a surface 108 (e.g., a surface mapping of the field 502). The mapping 162 may be generated by the EM system controller 142 based on the substances and/or the EM signal characteristics determined. In the illustrated embodiment, a path line 504 is drawn between each of the wells 120. Each path line 504 extending between a pair of wells 120 has a thickness that corresponds to the EM velocity (and/or an associated permeability) associated with one or more EM signal 150 transmitted between EM sensors 144 disposed in the wellbores 122 of the pair of wells 120. In some embodiments, the thicker path line 504 indicates a relatively high EM signal velocity (or relatively low permeability) and, thus may indicate the presence of a substance, such as oil, in the portion of the conductive layers proximate the path line 504 (e.g., in a portion of the reservoir 102 below the path line 504). Thus, such a mapping 162 may be indicative of the location of substances, including pockets of bypassed oil, water, and or the like. For example, the thicker path lines 504 toward the right side of the mapping 500 may indicate that a substance with a relatively high permeability, such as water, is present in portions of the conductive layers 112a and/or 112b located above and/or below the region of the field 502 represented by the right side of the mapping 162. The thinner path lines 504 toward the left side of the mapping 500 may indicate that a substance with a relatively low permeability, such as oil, is present in portions of the conductive layers 112a and/or 112b located above and/or below the region of the field 502 represented by the left side of the mapping 162. In some embodiments, the EM system controller 142 may determine that a substance with a relatively low permeability, such as oil, is present in portions of the conductive layers 112a and/or 112b located above and/or below the region represented by the left side of the mapping 162, and/or that a substance with a relatively high permeability, such as water, is present in portions of the conductive layers 112a and/or 112b located above and/or below the region represented by the right side of the mapping 162. The EM system controller 142 may provide for display of the mapping 162 and/or the determined locations for different substance (e.g., oil and water) via a display screen of the reservoir assessment system 140, for example. Such a mapping 162 and determined locations can be used to determine the location for additional production wells (e.g., to extract the bypassed oil), injection wells (e.g., to provide for the injection of water into the reservoir), the operation of existing injection wells (e.g., to determine quantity and rates of injection), and/or the operation of existing production wells (e.g., to determine production operations based on proximity of oil and/or water fronts).

Figure 6:
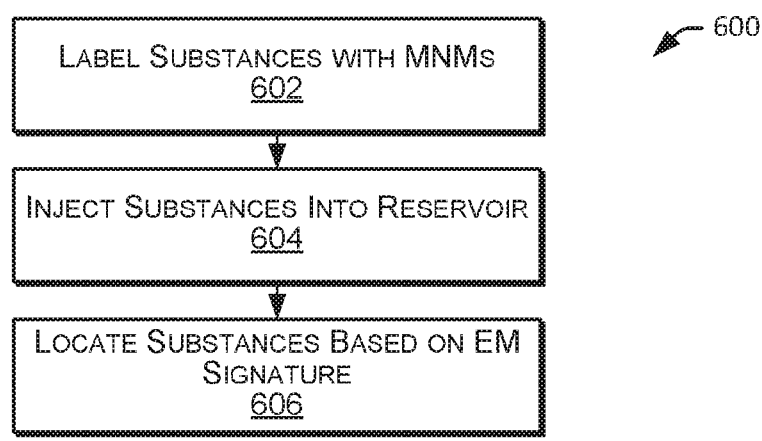
FIG. 6 is flowchart diagram that illustrates a method 600 for locating labeled substances in accordance with one or more embodiments.

FIG. 6 is flowchart diagram that illustrates a method 600 for locating labeled substances in accordance with one or more embodiments. The method 600 may include labeling substances with MNMs (block 602), injecting the labeled substances into a reservoir (block 604), and locating the labeled substances based on an EM signature of the labeled substance (block 606).

In some embodiments, labeling substances with contrast agents (block 602) includes mixing contrast agents with substances, such as slugs of water, to be injected into the reservoir 102. For example, labeling substances with contrast agents may include mixing a first set of contrast agents 180a (having first characteristics) into a first slug of water 182a to be injected into the reservoir 102 via the first well 120a (such that the labeled first slug of water 182a has a first signature corresponding to the characteristics of the first set of contrast agents 180a), and mixing a second set of contrast agents 180b (having a second characteristics) into a second slug of water 182b that is injected into the reservoir 102 via the second well 120b (such that the labeled second slug of water 182b has a second signature corresponding to the characteristics of the second set of contrast agents 180b).

In some embodiments, injecting the labeled substances into the reservoir (block 604) includes injecting the labeled substances into the 102. For example, injecting the labeled substances into a reservoir may include injecting the labeled first slug of water 182a injected into the reservoir 102 via the first well 120a at a first time (e.g., April 2014), and injecting the second labeled slug of water 182b into the reservoir 102 via the second well 120b at a second time (e.g., May 2015).

In some embodiments, locating the labeled substances based on a signature of the labeled substance (block 606) includes conducting EM detection operations, such as those described herein, to locate the labeled substances based on characteristics (e.g., travel time and/or velocity) of EM signals 150 propagating through a resistive layer of the reservoir 102. For example, the locations and/or the identity of the labeled slugs of water 182a can be determined based on the observed travel times of EM signals 150 across paths 160 proximate the labeled slugs of water 182a and 182b in the reservoir 102. For example, where the first slug of water 182a has migrated into a portion of the second conductive layer 112b between the first well 120a and the third well 120c, the set of EM data 146b for the second path 160b may indicate and/or be processed to determine the that an anomaly 114 having EM properties consistent with the labeled first slug of water 182a is located in the portions of the conductive layers 212 proximate the second path 160b (e.g., between the location of the first well 120a and the third well 120c). Similarly, where the second slug of water 182b has migrated into a portion of the second conductive layer 112b between the first well 120a and the second well 120b, a set of EM data 146a for the first path 160a may indicate and/or be processed to determine the that an anomaly 114 having EM properties consistent with the labeled second slug of water 182b is located in the portions of the conductive layers 212 proximate the first path 160b (e.g., between the location of the first well 120a and the second well 120b). Thus, substances, such as slugs of water, can be labeled with contrast agents, the labeled substances can be injected into the reservoir 102, and the EM detection operations described herein can be used to locate and identify the labeled substances in the reservoir 102. Moreover, the EM detection techniques described herein can be repeated over time, e.g., annually, to track the migration of the labeled substances through the reservoir 102.

Figure 7:
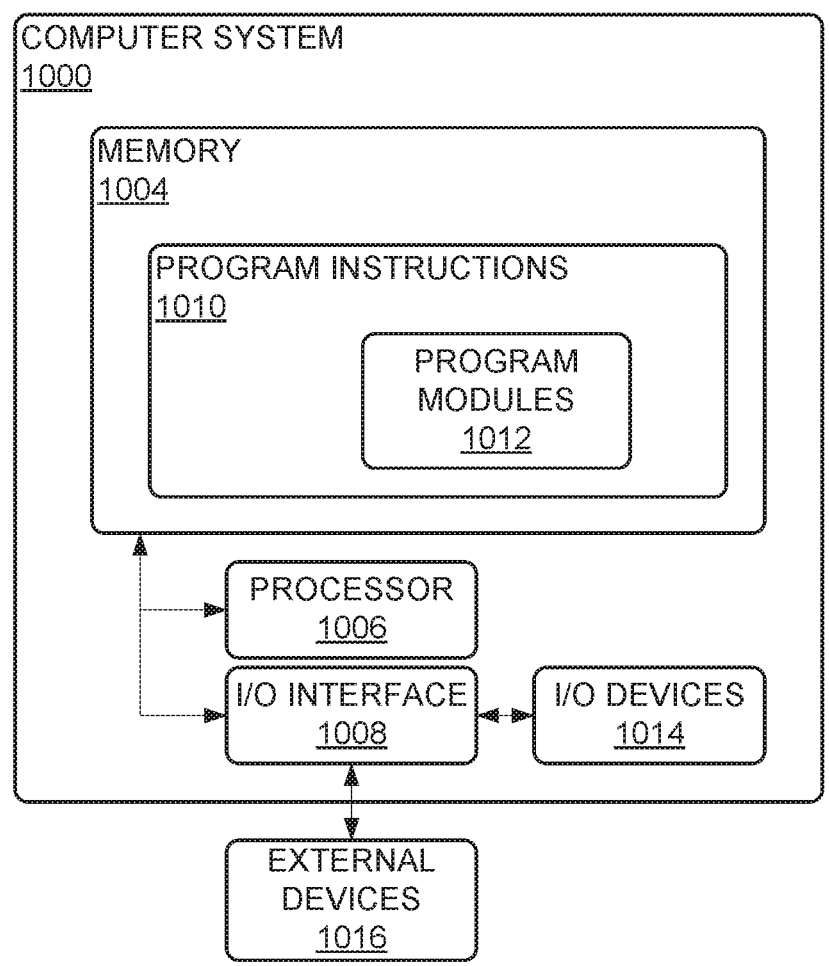
FIG. 7 is a diagram that illustrates an example computer system in accordance with one or more embodiments.

FIG. 7 is a diagram that illustrates an example computer system 1000 in accordance with one or more embodiments. In some embodiments, the computer system 1000 includes a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including those described with regard to the EM system controller 142, and/or the methods 400 and/or 600.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 2006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, a transceiver, and/or the like. In some embodiments, the computer system 1000 and/or the external devices 1016 may include one or more EM sensors, logging tools, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method for mapping a hydrocarbon reservoir, the method comprising:
    disposing an electromagnetic (EM) transmitter into a first wellbore of a first well penetrating a resistive layer of a subsurface formation, the EM transmitter being disposed at a depth corresponding to an intersection of the first wellbore and the resistive layer, the resistive layer being bounded by a first conductive layer located adjacent the resistive layer and a second conductive layer adjacent the resistive layer;
    disposing an EM receiver into a second wellbore of a second well penetrating the resistive layer of the subsurface formation, the EM receiver being disposed at a depth corresponding to an intersection of the second wellbore and the resistive layer;
    activating the EM transmitter to transmit an EM signal into the resistive layer at the first wellbore such that the EM signal propagates from the EM transmitter disposed in the first wellbore to the EM receiver disposed in second wellbore via the resistive layer;
    activating the EM receiver to receive the EM signal at the second wellbore;
    determining, based on the EM signal received at the second wellbore, transport properties associated with propagation of the EM signal from the EM transmitter to the EM receiver via the resistive layer; and
    determining a presence of an anomaly in at least one of the first and second conductive layers based on the transport properties.

2. The method of claim 1, wherein the EM signal comprises a frequency in the range of about 0.3 megahertz to 3 megahertz.

3. The method of claim 1, wherein the EM signal comprises a frequency of about 1 megahertz.

4. The method of claim 1, further comprising:
    determining a thickness of the resistive layer,
    wherein the EM signal comprises a wavelength that corresponds to the thickness of the resistive layer determined.

5. The method of claim 4, wherein the EM signal comprises a wavelength that is less than about 100 meters.

6. The method of claim 1, wherein the EM signal comprises a broadband pulse or a modulated alternating current (AC) signal.

7. The method of claim 1, wherein a first location of the EM transmitter disposed in the first wellbore and a second location the EM receiver disposed in the second wellbore are separated by a distance greater than about 1000 meters.

8. The method of claim 1,
    wherein the first wellbore comprises a first open hole portion at the intersection of the first wellbore and the resistive layer,
    wherein disposing the EM transmitter into the first wellbore comprises disposing the EM transmitter in the first open hole portion of the first wellbore,
    wherein the second wellbore comprises a second open hole portion at the intersection of the second wellbore and the resistive layer, and
    wherein disposing the EM receiver into the second wellbore comprises disposing the EM receiver in the second open hole portion of the second wellbore.

9. The method of claim 1,
    wherein the EM transmitter comprises a first antenna disposed in the first wellbore at a location proximate a portion of the resistive layer penetrated by the first wellbore, and
    wherein the EM receiver comprises a second antenna disposed in the second wellbore at a location proximate a portion of the resistive layer penetrated by the second wellbore.

10. The method of claim 1,
    wherein the EM transmitter comprises:
        a first conductive casing string disposed in the first wellbore, the first conductive casing string extending from a first wellhead and terminating proximate the intersection of the first wellbore and the resistive layer; and
        a first EM solenoid electrically coupled to the first conductive casing string via the first wellhead, and
    wherein activating the EM transmitter to transmit an EM signal into the resistive layer at the first wellbore comprises activating the first EM solenoid to generate an EM signal that is transmitted into the resistive layer via the first conductive casing string.

11. The method of claim 10, wherein the first conductive casing string terminates below the intersection of the first wellbore and the resistive layer.

12. The method of claim 1, wherein the EM receiver comprises:
- a second conductive casing string disposed in the second wellbore, the second conductive casing string extending from a second wellhead and terminating proximate the intersection of the second wellbore and the resistive layer; and
- a second EM solenoid electrically coupled to the second conductive casing string via the second wellhead, and
- wherein activating the EM receiver to receive the EM signal at the second wellbore comprises activating the second EM solenoid to receive the EM signal via the second conductive casing string.

13. The method of claim 12, wherein the second conductive casing string terminates below the intersection of the second wellbore and the resistive layer.

14. The method of claim 1, wherein the transport properties comprise a travel time associated with propagation of the EM signal from the EM transmitter to the EM receiver via the resistive layer, and wherein determining a presence of an anomaly in at least one of the first and second conductive layers based on the transport properties comprises:
- determining a velocity for the EM signal based on the travel time;
- determining a presence of an anomaly in at least one of the first and second conductive layers based on the velocity.

15. The method of claim 1, wherein the anomaly comprises a pocket of oil or a pocket of water in at least one of the first and second conductive layers.

16. The method of claim 1, wherein the transport properties comprise a travel time associated with propagation of the EM signal from the EM transmitter to the EM receiver via the resistive layer, and wherein determining a presence of an anomaly in at least one of the first and second conductive layers based on the transport properties comprises:
- determining a relatively high velocity for the EM signal based on the travel time; and
- determining a presence of oil in at least one of the first and second conductive layers based on the relatively high velocity.

17. The method of claim 1, wherein the transport properties comprise a travel time associated with propagation of the EM signal from the EM transmitter to the EM receiver via the resistive layer, and wherein determining a presence of an anomaly in at least one of the first and second conductive layers based on the transport properties comprises:
- determining a relatively low velocity for the EM signal based on the travel time; and
- determining a presence of water in at least one of the first and second conductive layers based on the relatively low velocity.

18. The method of claim 1, further comprising:
- disposing a second EM receiver into a third wellbore of a third well penetrating the resistive layer of the subsurface formation, the second EM receiver being disposed at a depth corresponding to an intersection of the third wellbore and the resistive layer;
- activating the second EM receiver to receive the EM signal at the third wellbore, the EM signal propagating from the EM transmitter to the second EM receiver via the resistive layer;
- determining second transport properties associated with propagation of the EM signal from the EM transmitter to the second EM receiver; and
- determining the presence of an anomaly in at least one of the first and second conductive layers based on the second transport properties and the transport properties associated with propagation of the EM signal from the EM transmitter to the EM receiver.

19. The method of claim 18, wherein determining the presence of an anomaly in at least one of the first and second conductive layers based on the second transport properties and the transport properties associated with propagation of the EM signal from the EM transmitter to the EM receiver comprises determining a boundary of an oil column in at least one of the first and second conductive layers.

20. The method of claim 18, wherein determining the presence of an anomaly in at least one of the first and second conductive layers based on the second transport properties and the transport properties associated with propagation of the EM signal from the EM transmitter to the EM receiver comprises determining a boundary of a water pocket in at least one of the first and second conductive layers.

21. The method of claim 1, further comprising:
- determining the intersection of the first wellbore and the resistive layer based on a first well log for the first well; and
- determining the intersection of the second wellbore and the resistive layer based on a second well log for the second well.

22. The method of claim 1, wherein the resistive layer comprises an anhydrite layer, wherein the first conductive layer comprises a first carbonate layer, and wherein the second conductive layer comprises a second carbonate layer.

23. The method of claim 1, wherein at least one of the first and second conductive layers comprises strata of a hydrocarbon reservoir determined to comprise hydrocarbons.

24. The method of claim 1, further comprising:
- injecting, into the reservoir, a labeled slug of a substance having a first EM signature, the labeled slug of the substance comprising the substance and contrast agents defining the first EM signature, wherein the anomaly comprises the labeled slug of the substance.

25. A system for mapping a hydrocarbon reservoir, the system comprising:
- an electromagnetic (EM) transmitter configured to be disposed in a first wellbore of a first well penetrating a resistive layer of a subsurface formation, the EM transmitter configured to be disposed at a depth corresponding to an intersection of the first wellbore and the resistive layer, the resistive layer being bounded by a first conductive layer located adjacent the resistive layer and a second conductive layer located adjacent the resistive layer;
- an EM receiver configured to be disposed in a second wellbore of a second well penetrating the resistive layer of the subsurface formation, the EM receiver configured to be disposed at a depth corresponding to an intersection of the second wellbore and the resistive layer;
- the EM transmitter configured to transmit an EM signal into the resistive layer at the first wellbore such that the EM signal propagates from the EM transmitter disposed in the first wellbore to the EM receiver disposed in second wellbore via the resistive layer;
- the EM receiver configured to receive the EM signal at the second wellbore; and
- a mapping system configured to:

determine, based on the EM signal received at the second wellbore, transport properties associated with propagation of the EM signal from the EM transmitter to the EM receiver via the resistive layer; and
determine a presence of an anomaly in at least one of the first and second conductive layers based on the transport properties.

26. The system of claim 25, wherein the EM signal comprises a frequency in the range of about 0.3 megahertz to 3 megahertz.

27. The system of claim 25, wherein the EM signal comprises a frequency of about 1 megahertz.

28. The system of claim 25, wherein the EM signal comprises a wavelength that corresponds to the thickness of the resistive layer.

29. The system of claim 28, wherein the EM signal comprises a wavelength that is less than about 100 meters.

30. The system of claim 25, wherein the EM signal comprises a broadband pulse or a modulated alternating current (AC) signal.

31. The system of claim 25, wherein a first location of the EM transmitter disposed in the first wellbore and a second location the EM receiver disposed in the second wellbore are separated by a distance greater than about 1000 meters.

32. The system of claim 25,
wherein the first wellbore comprises a first open hole portion at the intersection of the first wellbore and the resistive layer,
wherein the EM transmitter is configured to be disposed in the first open hole portion of the first wellbore,
wherein the second wellbore comprises a second open hole portion at the intersection of the second wellbore and the resistive layer, and
wherein the EM receiver is configured to be disposed in the second open hole portion of the second wellbore.

33. The system of claim 25,
wherein the EM transmitter comprises a first antenna configured to be disposed in the first wellbore at a location adjacent a portion of the resistive layer penetrated by the first wellbore, and
wherein the EM receiver comprises a second antenna configured to be disposed in the second wellbore at a location adjacent a portion of the resistive layer penetrated by the second wellbore.

34. The system of claim 25,
wherein the EM transmitter comprises:
a first conductive casing string disposed in the first wellbore, the first conductive casing string extending from a first wellhead and terminating proximate the intersection of the first wellbore and the resistive layer; and
a first EM solenoid electrically coupled to the first conductive casing string via the first wellhead, and
wherein the first EM solenoid is configured to be activated to generate an EM signal that is transmitted into the resistive layer via the first conductive casing string.

35. The system of claim 34, wherein the first conductive casing string terminates below the intersection of the first wellbore and the resistive layer.

36. The system of claim 25,
wherein the EM receiver comprises:
a second conductive casing string disposed in the second wellbore, the second conductive casing string extending from a second wellhead and terminating proximate the intersection of the second wellbore and the resistive layer; and
a second EM solenoid electrically coupled to the second conductive casing string via the second wellhead, and
wherein the second EM solenoid is configured to be activated to receive the EM signal via the second conductive casing string.

37. The system of claim 36, wherein the second conductive casing string terminates below the intersection of the second wellbore and the resistive layer.

38. The system of claim 25, wherein the transport properties comprise a travel time associated with propagation of the EM signal from the EM transmitter to the EM receiver via the resistive layer, and wherein determining a presence of an anomaly in at least one of the first and second conductive layers based on the transport properties comprises:
determining a velocity for the EM signal based on the travel time;
determining a presence of an anomaly in at least one of the first and second conductive layers based on the velocity.

39. The system of claim 25, wherein the anomaly comprises a pocket of oil or a pocket of water in at least one of the one of the first and second conductive layers.

40. The system of claim 25, wherein the transport properties comprise a travel time associated with propagation of the EM signal from the EM transmitter to the EM receiver via the resistive layer, and wherein determining a presence of an anomaly in at least one of the first and second conductive layers based on the transport properties comprises:
determining a relatively high velocity for the EM signal based on the travel time; and
determining a presence of oil in at least one of the first and second conductive layers based on the relatively high velocity.

41. The system of claim 25, wherein the transport properties comprise a travel time associated with propagation of the EM signal from the EM transmitter to the EM receiver via the resistive layer, and wherein determining a presence of an anomaly in at least one of the first and second conductive layers based on the transport properties comprises:
determining a relatively low velocity for the EM signal based on the travel time; and
determining a presence of water in at least one of the first and second conductive layers based on the relatively low velocity.

42. The system of claim 25, further comprising:
a second EM receiver configured to be disposed into a third wellbore of a third well penetrating the resistive layer of the subsurface formation, the second EM receiver configured to be disposed at a depth corresponding to an intersection of the third wellbore and the resistive layer;
the second EM receiver configured to be activated to receive the EM signal at the third wellbore, the EM signal propagating from the EM transmitter to the second EM receiver via the resistive layer;
the mapping system being further configured to:
determine second transport properties associated with propagation of the EM signal from the EM transmitter to the second EM receiver; and
determine the presence of an anomaly in at least one of the first and second conductive layers based on the second transport properties and the transport properties associated with propagation of the EM signal from the EM transmitter to the EM receiver.

43. The system of claim 42, wherein determining the presence of an anomaly in at least one of the first and second conductive layers based on the second transport properties and the transport properties associated with propagation of the EM signal from the EM transmitter to the EM receiver comprises determining a boundary of an oil column in at least one of the first and second conductive layers.

44. The system of claim 42, wherein determining the presence of an anomaly in at least one of the first and second conductive layers based on the second transport properties and the transport properties associated with propagation of the EM signal from the EM transmitter to the EM receiver comprises determining a boundary of a water pocket in at least one of the first and second conductive layers.

45. The system of claim 25, wherein the mapping system is further configured to:
   determine the intersection of the first wellbore and the resistive layer based on a first well log for the first well; and
   determine the intersection of the second wellbore and the resistive layer based on a second well log for the second well.

46. The system of claim 25, wherein the resistive layer comprises an anhydrite layer, wherein the first conductive layer comprises a first carbonate layer, and wherein the second conductive layer comprises a second carbonate layer.

47. The system of claim 25, wherein at least one of the first and second conductive layers comprises strata of a hydrocarbon reservoir determined to comprise hydrocarbons.

48. A non-transitory computer readable medium comprising program instructions stored thereon for mapping a hydrocarbon reservoir, the program instructions being executable by a processor to perform the following operations:
   activating an electromagnetic (EM) transmitter to transmit an EM signal into a resistive layer a subsurface formation at a first wellbore such that the EM signal propagates from the EM transmitter to an EM receiver disposed in a second wellbore via the resistive layer, the EM transmitter being disposed in a first wellbore of a first well penetrating the resistive layer of the subsurface formation, the EM transmitter being disposed at a depth corresponding to an intersection of the first wellbore and the resistive layer, and the resistive layer being bounded by a first conductive layer located adjacent the resistive layer and a second conductive layer located adjacent the resistive layer;
   activating an EM receiver to receive the EM signal at the second wellbore, the EM receiver being disposed in a second wellbore of a second well penetrating the resistive layer of the subsurface formation, the EM receiver being disposed at a depth corresponding to an intersection of the second wellbore and the resistive layer;
   determining transport properties associated with propagation of the EM signal from the EM transmitter to the EM receiver via the resistive layer; and
   determining a presence of an anomaly in at least one of the first and second conductive layers based on the transport properties.

* * * * *